(12) United States Patent
Olarig

(10) Patent No.: US 11,923,992 B2
(45) Date of Patent: *Mar. 5, 2024

(54) MODULAR SYSTEM (SWITCH BOARDS AND MID-PLANE) FOR SUPPORTING 50G OR 100G ETHERNET SPEEDS OF FPGA+SSD

(71) Applicant: Samsung Electronics Co., Ltd., Suwon-si (KR)

(72) Inventor: Sompong Paul Olarig, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,075

(22) Filed: Sep. 15, 2020

(65) Prior Publication Data

US 2020/0412557 A1 Dec. 31, 2020

Related U.S. Application Data

(63) Continuation of application No. 16/202,079, filed on Nov. 27, 2018, which is a continuation-in-part of application No. 15/256,495, filed on Sep. 2, 2016.
(Continued)

(51) Int. Cl.
*H04L 12/04* (2006.01)
*G06F 30/331* (2020.01)
(Continued)

(52) U.S. Cl.
CPC ............ *H04L 12/04* (2013.01); *G06F 30/331* (2020.01); *H03K 19/1733* (2013.01);
(Continued)

(58) Field of Classification Search
CPC ....... H04L 12/04; H04L 12/44; G06F 30/331; H03K 19/1733
See application file for complete search history.

(56) References Cited

U.S. PATENT DOCUMENTS 6,295,567 B1 9/2001 Bassman et al.
6,345,303 B1 2/2002 Knauerhase et al.
(Continued)

FOREIGN PATENT DOCUMENTS

CN 1641568 A 7/2005
CN 101847429 B 5/2012
(Continued)

OTHER PUBLICATIONS

Corrected Notice of Allowability for U.S. Appl. No. 15/256,495, dated May 13, 2021.
(Continued)

*Primary Examiner* — Tammara R Peyton
(74) *Attorney, Agent, or Firm* — Renaissance IP Law Group LLP

(57) ABSTRACT

A chassis front-end is disclosed. The chassis front-end may include a switchboard including an Ethernet switch, a Baseboard Management Controller, and a mid-plane connector. The chassis front-end may also include a mid-plane including at least one storage device connector and a speed logic to inform at least one storage device of an Ethernet speed of the chassis front-end. The Ethernet speeds may vary.

18 Claims, 11 Drawing Sheets

Related U.S. Application Data

(60) Provisional application No. 62/366,622, filed on Jul. 26, 2016, provisional application No. 62/638,040, filed on Mar. 2, 2018, provisional application No. 62/745,967, filed on Oct. 15, 2018.

(51) Int. Cl.
*H03K 19/173* (2006.01)
*H04L 12/44* (2006.01)
*G06F 13/38* (2006.01)
*G06F 13/40* (2006.01)

(52) U.S. Cl.
CPC ............ *H04L 12/44* (2013.01); *G06F 13/385* (2013.01); *G06F 13/4022* (2013.01); *H04L 2012/445* (2013.01)

(56) References Cited

U.S. PATENT DOCUMENTS

| | | |
|---|---|---|
| 6,427,198 B1 | 7/2002 | Berglund et al. |
| 6,611,863 B1 | 8/2003 | Banginwar |
| 6,662,119 B1 | 12/2003 | Mitchell |
| 7,107,253 B1 | 9/2006 | Sumner et al. |
| 7,120,759 B2 | 10/2006 | Chiu et al. |
| 7,143,153 B1 | 11/2006 | Black et al. |
| 7,249,173 B2 | 7/2007 | Nicolson |
| 7,512,585 B2 | 3/2009 | Agarwal et al. |
| 7,536,486 B2 | 5/2009 | Sadovsky et al. |
| 7,620,854 B2 | 11/2009 | Kuttan et al. |
| 7,873,700 B2 | 1/2011 | Pawlowski et al. |
| 7,882,393 B2 | 2/2011 | Grimes et al. |
| 7,944,812 B2 | 5/2011 | Carlson et al. |
| 8,065,347 B1 | 11/2011 | DeMeyer et al. |
| 8,180,862 B2 | 5/2012 | Baker et al. |
| 8,396,981 B1 | 3/2013 | Lee et al. |
| 8,599,863 B2 | 12/2013 | Davis |
| 8,667,224 B1 | 3/2014 | Yu et al. |
| 8,754,681 B2 | 6/2014 | Zhu et al. |
| 8,832,327 B1 | 9/2014 | Lin |
| 8,943,234 B1 | 1/2015 | Voorhees et al. |
| 8,949,517 B2 | 2/2015 | Cohen et al. |
| 8,953,644 B2 | 2/2015 | Chandra et al. |
| 8,998,636 B2 | 4/2015 | Gomez et al. |
| 9,037,786 B2 | 5/2015 | Asnaashari et al. |
| 9,047,222 B2 | 6/2015 | Chandra et al. |
| 9,092,321 B2 | 7/2015 | Salessi |
| 9,244,865 B2 | 1/2016 | Hutchison et al. |
| 9,244,877 B2 | 1/2016 | Yang et al. |
| 9,253,275 B2 | 2/2016 | Bhogal et al. |
| 9,280,357 B2 | 3/2016 | Shaver et al. |
| 9,280,504 B2 | 3/2016 | Ben-Michael et al. |
| 9,389,805 B2 | 7/2016 | Cohen et al. |
| 9,400,749 B1 | 7/2016 | Kuzmin et al. |
| 9,460,042 B2 | 10/2016 | Iskandar et al. |
| 9,465,756 B2 | 10/2016 | Bennett |
| 9,648,148 B2 | 5/2017 | Rimmer et al. |
| 9,653,124 B2 | 5/2017 | Heyd et al. |
| 9,734,093 B2 | 8/2017 | Khemani et al. |
| 9,734,106 B2 | 8/2017 | Kotzur et al. |
| 9,785,346 B2 | 10/2017 | Yost |
| 9,785,355 B2 | 10/2017 | Huang |
| 9,785,356 B2 | 10/2017 | Huang |
| 9,811,481 B2 | 11/2017 | Bhatia et al. |
| 9,830,082 B1 | 11/2017 | Srinivasan et al. |
| 9,842,084 B2 | 12/2017 | Friedman et al. |
| 9,904,330 B2 | 2/2018 | Schuette et al. |
| 9,906,596 B2 | 2/2018 | Sikdar |
| 9,934,173 B1 | 4/2018 | Sakalley et al. |
| 9,934,183 B2 | 4/2018 | Brassac et al. |
| 9,959,240 B2 | 5/2018 | Mundt |
| 9,965,367 B2 | 5/2018 | Shih |
| 9,990,313 B2 | 6/2018 | Monji et al. |
| 10,019,388 B2 | 7/2018 | Long et al. |
| 10,063,638 B2 | 8/2018 | Huang |
| 10,108,450 B2 | 10/2018 | Pinto et al. |
| 10,114,778 B2 | 10/2018 | Worley et al. |
| 10,162,784 B2 | 12/2018 | Bassett et al. |
| 10,206,297 B2 | 2/2019 | Breakstone et al. |
| 10,223,313 B2 | 3/2019 | Shih |
| 10,223,316 B2 | 3/2019 | Mataya |
| 10,235,313 B2 | 3/2019 | Lee et al. |
| 10,255,215 B2 | 4/2019 | Breakstone et al. |
| 10,275,356 B2 | 4/2019 | Chou et al. |
| 10,289,517 B2 | 5/2019 | Beerens |
| 10,289,588 B2 | 5/2019 | Chu et al. |
| 10,318,443 B2 | 6/2019 | Su |
| 10,346,041 B2 | 7/2019 | Olarig et al. |
| 10,372,648 B2 | 8/2019 | Qiu |
| 10,372,659 B2 | 8/2019 | Olarig et al. |
| 10,394,723 B2 | 8/2019 | Yang et al. |
| 10,452,576 B2 | 10/2019 | Stuhlsatz |
| 10,467,163 B1 | 11/2019 | Malwankar et al. |
| 10,467,170 B2 | 11/2019 | McKnight |
| 10,474,589 B1 | 11/2019 | Raskin |
| 10,560,550 B1 | 2/2020 | Xue et al. |
| 10,592,144 B2 | 3/2020 | Roberts et al. |
| 10,733,137 B2 | 8/2020 | Kachare et al. |
| 10,866,911 B2 | 12/2020 | Qiu et al. |
| 10,901,927 B2 | 1/2021 | Fischer et al. |
| 10,929,327 B1 | 2/2021 | Schrempp et al. |
| 10,942,666 B2 | 3/2021 | Pydipaty et al. |
| 11,113,046 B1 | 9/2021 | Bowen et al. |
| 11,126,352 B2 | 9/2021 | Olarig et al. |
| 11,347,740 B2 | 5/2022 | Moshe et al. |
| 2002/0087887 A1 | 7/2002 | Busam et al. |
| 2002/0095491 A1 | 7/2002 | Edmonds et al. |
| 2002/0123365 A1 | 9/2002 | Thorson et al. |
| 2003/0058818 A1 | 3/2003 | Wilkes et al. |
| 2004/0073912 A1 | 4/2004 | Meza |
| 2004/0111590 A1 | 6/2004 | Klein |
| 2004/0147281 A1 | 7/2004 | Holcombe et al. |
| 2004/0153844 A1 | 8/2004 | Ghose et al. |
| 2005/0025125 A1 | 2/2005 | Kwan |
| 2005/0060442 A1 | 3/2005 | Beverly et al. |
| 2005/0120157 A1 | 6/2005 | Chen et al. |
| 2006/0059287 A1 | 3/2006 | Rivard et al. |
| 2006/0095625 A1 | 5/2006 | Wootten et al. |
| 2006/0098681 A1 | 5/2006 | Cafiero et al. |
| 2006/0136621 A1 | 6/2006 | Tung et al. |
| 2006/0202950 A1 | 9/2006 | Lee et al. |
| 2007/0077553 A1 | 4/2007 | Bentwich |
| 2008/0003845 A1 | 1/2008 | Hong et al. |
| 2008/0288708 A1 | 11/2008 | Hsueh |
| 2009/0073896 A1 | 3/2009 | Gillingham et al. |
| 2009/0077478 A1 | 3/2009 | Gillingham et al. |
| 2009/0217188 A1 | 8/2009 | Alexander et al. |
| 2009/0222733 A1 | 9/2009 | Basham et al. |
| 2009/0259364 A1 | 10/2009 | Vollmer et al. |
| 2010/0077067 A1 | 3/2010 | Strole |
| 2010/0100858 A1 | 4/2010 | Schipper |
| 2010/0106836 A1 | 4/2010 | Schreyer et al. |
| 2010/0169512 A1 | 7/2010 | Matton et al. |
| 2011/0131380 A1 | 6/2011 | Rallens et al. |
| 2011/0151858 A1 | 6/2011 | Lai |
| 2012/0056728 A1 | 3/2012 | Erdmann et al. |
| 2012/0102580 A1 | 4/2012 | Bealkowski |
| 2012/0207156 A1 | 8/2012 | Srinivasan et al. |
| 2012/0311654 A1 | 12/2012 | Dougherty, III et al. |
| 2012/0319750 A1 | 12/2012 | Zhu et al. |
| 2013/0117503 A1 | 5/2013 | Nellans et al. |
| 2013/0117766 A1 | 5/2013 | Bax et al. |
| 2013/0179624 A1 | 7/2013 | Lambert et al. |
| 2013/0198311 A1 | 8/2013 | Tamir et al. |
| 2013/0198312 A1 | 8/2013 | Tamir et al. |
| 2013/0242991 A1 | 9/2013 | Basso et al. |
| 2013/0282953 A1 | 10/2013 | Orme et al. |
| 2013/0304979 A1 | 11/2013 | Zimmer et al. |
| 2013/0311795 A1 | 11/2013 | Cong et al. |
| 2013/0318371 A1 | 11/2013 | Hormuth |
| 2013/0325998 A1 | 12/2013 | Hormuth et al. |
| 2014/0032641 A1 | 1/2014 | Du |
| 2014/0052928 A1 | 2/2014 | Shimoi |
| 2014/0122746 A1 | 5/2014 | Shaver et al. |

(56) References Cited

U.S. PATENT DOCUMENTS

| | | |
|---|---|---|
| 2014/0195634 A1 | 7/2014 | Kishore et al. |
| 2014/0195711 A1 | 7/2014 | Bhatia et al. |
| 2014/0258679 A1 | 9/2014 | McGee |
| 2014/0281458 A1 | 9/2014 | Ravimohan et al. |
| 2014/0317206 A1 | 10/2014 | Lomelino et al. |
| 2014/0330995 A1 | 11/2014 | Levy et al. |
| 2014/0344431 A1 | 11/2014 | Hsu et al. |
| 2015/0006758 A1 | 1/2015 | Holtman et al. |
| 2015/0039815 A1 | 2/2015 | Klein |
| 2015/0067188 A1 | 3/2015 | Chakhaiyar |
| 2015/0086017 A1 | 3/2015 | Taylor et al. |
| 2015/0106660 A1 | 4/2015 | Chumbalkar et al. |
| 2015/0120874 A1 | 4/2015 | Kim et al. |
| 2015/0120971 A1 | 4/2015 | Bae et al. |
| 2015/0138900 A1 | 5/2015 | Choi |
| 2015/0178095 A1 | 6/2015 | Balakrishnan et al. |
| 2015/0181760 A1 | 6/2015 | Stephens |
| 2015/0205541 A1 | 7/2015 | Nishtala et al. |
| 2015/0234815 A1 | 8/2015 | Slik |
| 2015/0254088 A1 | 9/2015 | Chou et al. |
| 2015/0255130 A1 | 9/2015 | Lee et al. |
| 2015/0261434 A1 | 9/2015 | Kagan et al. |
| 2015/0286599 A1 | 10/2015 | Hershberger |
| 2015/0301757 A1 | 10/2015 | Iwata et al. |
| 2015/0301964 A1 | 10/2015 | Brinicombe et al. |
| 2015/0304423 A1 | 10/2015 | Satoyama et al. |
| 2015/0317176 A1 | 11/2015 | Hussain et al. |
| 2015/0324312 A1 | 11/2015 | Jacobson et al. |
| 2015/0331473 A1 | 11/2015 | Jreji et al. |
| 2015/0350096 A1 | 12/2015 | Dinc et al. |
| 2015/0370661 A1 | 12/2015 | Swanson et al. |
| 2015/0370665 A1 | 12/2015 | Cannata et al. |
| 2015/0376840 A1 | 12/2015 | Shih |
| 2015/0381734 A1 | 12/2015 | Ebihara et al. |
| 2016/0004879 A1 | 1/2016 | Fisher et al. |
| 2016/0062936 A1 | 3/2016 | Brassac et al. |
| 2016/0077841 A1 | 3/2016 | Lambert et al. |
| 2016/0085718 A1 | 3/2016 | Huang |
| 2016/0092390 A1 | 3/2016 | Grothen et al. |
| 2016/0094619 A1 | 3/2016 | Khan et al. |
| 2016/0127468 A1 | 5/2016 | Malwankar et al. |
| 2016/0127492 A1 | 5/2016 | Malwankar et al. |
| 2016/0146754 A1 | 5/2016 | Prasad et al. |
| 2016/0147446 A1 | 5/2016 | Ghosh |
| 2016/0188313 A1 | 6/2016 | Dubal et al. |
| 2016/0246754 A1 | 8/2016 | Rao et al. |
| 2016/0259597 A1 | 9/2016 | Worley et al. |
| 2016/0261375 A1 | 9/2016 | Roethig et al. |
| 2016/0283428 A1 | 9/2016 | Guddeti |
| 2016/0306723 A1 | 10/2016 | Lu |
| 2016/0306768 A1 | 10/2016 | Mataya |
| 2016/0328344 A1 | 11/2016 | Jose et al. |
| 2016/0328347 A1 | 11/2016 | Worley et al. |
| 2016/0337272 A1 | 11/2016 | Berman |
| 2016/0366071 A1* | 12/2016 | Chandran et al. .... H04L 49/352 |
| 2017/0018149 A1 | 1/2017 | Shih |
| 2017/0038804 A1 | 2/2017 | Shows et al. |
| 2017/0063965 A1 | 3/2017 | Grenader |
| 2017/0068268 A1 | 3/2017 | Giriyappa et al. |
| 2017/0068628 A1 | 3/2017 | Calciu et al. |
| 2017/0068630 A1 | 3/2017 | Iskandar et al. |
| 2017/0168943 A1 | 6/2017 | Chou et al. |
| 2017/0185554 A1 | 6/2017 | Fricker |
| 2017/0187629 A1 | 6/2017 | Shalev et al. |
| 2017/0206034 A1 | 7/2017 | Fetik |
| 2017/0262029 A1 | 9/2017 | Nelson et al. |
| 2017/0269871 A1 | 9/2017 | Khan et al. |
| 2017/0270001 A1 | 9/2017 | Suryanarayana et al. |
| 2017/0270060 A1 | 9/2017 | Gupta et al. |
| 2017/0286305 A1 | 10/2017 | Kalwitz |
| 2017/0317901 A1 | 11/2017 | Agrawal et al. |
| 2017/0344259 A1 | 11/2017 | Freyensee et al. |
| 2017/0344294 A1 | 11/2017 | Mishra et al. |
| 2017/0357299 A1 | 12/2017 | Shabbir et al. |
| 2017/0357515 A1 | 12/2017 | Bower, III et al. |
| 2018/0004695 A1 | 1/2018 | Chu et al. |
| 2018/0019896 A1 | 1/2018 | Paquet et al. |
| 2018/0032462 A1 | 2/2018 | Olarig et al. |
| 2018/0032463 A1 | 2/2018 | Olarig et al. |
| 2018/0032469 A1 | 2/2018 | Olarig et al. |
| 2018/0032471 A1 | 2/2018 | Olarig |
| 2018/0052745 A1 | 2/2018 | Marripudi et al. |
| 2018/0074717 A1 | 3/2018 | Olarig et al. |
| 2018/0074984 A1 | 3/2018 | Olarig et al. |
| 2018/0095904 A1 | 4/2018 | Bunker et al. |
| 2018/0101492 A1 | 4/2018 | Cho et al. |
| 2018/0131633 A1 | 5/2018 | Li |
| 2018/0173652 A1 | 6/2018 | Olarig et al. |
| 2018/0210517 A1 | 7/2018 | Yun |
| 2018/0227369 A1 | 8/2018 | DuCray et al. |
| 2018/0267925 A1 | 9/2018 | Rees |
| 2018/0275919 A1 | 9/2018 | Chirumamilla et al. |
| 2018/0307650 A1 | 10/2018 | Kachare et al. |
| 2018/0335958 A1 | 11/2018 | Wu et al. |
| 2018/0365185 A1 | 12/2018 | Risinger et al. |
| 2018/0373609 A1 | 12/2018 | Beerens |
| 2019/0042424 A1 | 2/2019 | Nair |
| 2019/0087268 A1 | 3/2019 | Koltsidas et al. |
| 2019/0104632 A1 | 4/2019 | Nelson et al. |
| 2019/0286584 A1 | 9/2019 | Olarig et al. |
| 2019/0339888 A1 | 11/2019 | Sasidharan et al. |
| 2020/0042217 A1 | 2/2020 | Roberts et al. |
| 2020/0117663 A1 | 4/2020 | Moshe et al. |
| 2020/0293916 A1 | 9/2020 | Li |
| 2021/0342281 A1 | 11/2021 | Olarig et al. |
| 2022/0188002 A1 | 6/2022 | Olarig |
| 2022/0206693 A1 | 6/2022 | Jung et al. |

FOREIGN PATENT DOCUMENTS

| | | |
|---|---|---|
| CN | 103946824 A | 7/2014 |
| CN | 104025063 A | 9/2014 |
| CN | 104202197 A | 12/2014 |
| CN | 104572516 A | 4/2015 |
| CN | 104615577 A | 5/2015 |
| CN | 105260275 A | 1/2016 |
| CN | 105912275 A | 8/2016 |
| CN | 103412769 B | 11/2017 |
| CN | 107659518 B | 11/2021 |
| EP | 2290497 A1 | 3/2011 |
| EP | 2843557 A1 | 3/2015 |
| JP | 2001290752 A | 10/2001 |
| JP | 4257050 B2 | 4/2009 |
| JP | 2010146525 A | 7/2010 |
| JP | 2011048534 A | 3/2011 |
| JP | 2012506184 A | 3/2012 |
| JP | 2013041390 A | 2/2013 |
| JP | 2014241545 A | 12/2014 |
| JP | 2015049742 A | 3/2015 |
| JP | 2015191649 A | 11/2015 |
| JP | 2015194005 A | 11/2015 |
| JP | 2015532985 A | 11/2015 |
| JP | 2016037501 A | 3/2016 |
| JP | 2016045968 A | 4/2016 |
| JP | WO2015194005 A1 | 4/2017 |
| KR | 20090106469 A | 10/2009 |
| KR | 20120135205 A | 12/2012 |
| KR | 20150047785 A | 5/2015 |
| KR | 20150071898 A | 6/2015 |
| KR | 20160074659 A | 6/2016 |
| TW | 201445325 A | 12/2014 |
| WO | 2013077867 A1 | 5/2013 |
| WO | 2014209764 A1 | 12/2014 |
| WO | 2015049742 A1 | 4/2015 |
| WO | 2015191649 A1 | 12/2015 |
| WO | 2016037501 A1 | 3/2016 |
| WO | 2016085016 A1 | 6/2016 |

OTHER PUBLICATIONS

Corrected Notice of Allowability for U.S. Appl. No. 15/345,509, dated Jun. 15, 2021.

(56) References Cited

OTHER PUBLICATIONS

Corrected Notice of Allowability for U.S. Appl. No. 16/921,923, dated May 26, 2021.
Notice of Allowance for U.S. Appl. No. 15/345,509, dated May 13, 2021.
Notice of Allowance for U.S. Appl. No. 16/202,079, dated May 14, 2021.
Notice of Allowance for U.S. Appl. No. 16/424,474, dated Apr. 30, 2021.
Notice of Allowance for U.S. Appl. No. 16/857,172, dated May 3, 2021.
Corrected Notice of Allowability for U.S. Appl. No. 15/345,509, dated Aug. 11, 2021.
Corrected Notice of Allowability for U.S. Appl. No. 16/202,079, dated Jul. 12, 2021.
Corrected Notice of Allowability for U.S. Appl. No. 16/921,923, dated Jul. 14, 2021.
Advisory Action for U.S. Appl. No. 15/256,495, dated Feb. 1, 2019.
Corrected Notice of Allowability for U.S. Appl. No. 16/202,079, dated Jul. 22, 2020.
Fang, Chin, "Using NVMe Gen3 PCIe SSD Cards in High-density Servers for High-performance Big Data Transfer Over Multiple Network Channels", SLAC National Accelerator Laboratory, Stanford University, Stanford, California, Feb. 7, 2015, 17 pages.
Final Office Action for U.S. Appl. No. 15/256,495, dated Dec. 4, 2019.
Final Office Action for U.S. Appl. No. 15/256,495, dated Oct. 19, 2018.
Final Office Action for U.S. Appl. No. 15/345,509, dated Feb. 21, 2019.
Final Office Action for U.S. Appl. No. 15/411,962, dated Dec. 20, 2018.
Final Office Action for U.S. Appl. No. 16/424,474, dated May 1, 2020.
Notice of Allowance for U.S. Appl. No. 15/256,495, dated Mar. 5, 2020.
Notice of Allowance for U.S. Appl. No. 15/345,507, dated Feb. 19, 2019.
Notice of Allowance for U.S. Appl. No. 15/411,962, dated Mar. 18, 2019.
Notice of Allowance for U.S. Appl. No. 16/202,079, dated Jun. 1, 2020.
Notice of Allowance for U.S. Appl. No. 16/421,458, dated Apr. 15, 2020.
Notice of Allowance for U.S. Appl. No. 16/424,474, dated Jul. 15, 2020.
NVM Express over Fabrics specification Revision 1.0; NVM Express Inc.; Jun. 5, 2016. (Year: 2016).
Office Action for U.S. Appl. No. 15/256,495, dated Jun. 14, 2019.
Office Action for U.S. Appl. No. 15/256,495, dated Mar. 29, 2018.
Office Action for U.S. Appl. No. 15/345,507, dated Dec. 3, 2018.
Office Action for U.S. Appl. No. 15/345,509, dated Apr. 29, 2020.
Office Action for U.S. Appl. No. 15/345,509, dated Nov. 29, 2019.
Office Action for U.S. Appl. No. 15/345,509, dated Sep. 10, 2018.
Office Action for U.S. Appl. No. 15/411,962, dated Aug. 10, 2018.
Office Action for U.S. Appl. No. 16/202,079, dated Aug. 22, 2019.
Office Action for U.S. Appl. No. 16/202,079, dated Mar. 4, 2020.
Office Action for U.S. Appl. No. 16/421,458, dated Dec. 30, 2019.
Office Action for U.S. Appl. No. 16/424,474, dated Feb. 3, 2020.
Office Action for U.S. Appl. No. 16/424,474, dated Oct. 15, 2019.
Office Action for U.S. Appl. No. 16/844,995, dated Sep. 4, 2020.
Office Action for U.S. Appl. No. 16/921,923, dated Oct. 28, 2020.
Corrected Notice of Allowability for U.S. Appl. No. 15/256,495, dated Mar. 18, 2021.
Corrected Notice of Allowability for U.S. Appl. No. 16/424,474, dated Feb. 22, 2021.
Notice of Allowance for U.S. Appl. No. 16/202,079, dated Jan. 27, 2021.
Notice of Allowance for U.S. Appl. No. 16/921,923, dated Feb. 18, 2021.
Office Action for U.S. Appl. No. 15/345,509, dated Sep. 28, 2020.
Office Action for U.S. Appl. No. 16/857,172, dated Oct. 8, 2020.
Corrected Notice of Allowability for U.S. Appl. No. 16/424,474, dated Mar. 29, 2021.
Corrected Notice of Allowability for U.S. Appl. No. 16/921,923, dated Apr. 1, 2021.
Final Office Action for U.S. Appl. No. 16/844,995, dated Mar. 29, 2021.
Notice of Allowance for U.S. Appl. No. 15/403,088, dated Oct. 22, 2018.
OC3D, "What is the New U.2 SSD Connection?," (https://www.overclock3d.net/news/storage/what_is_the_new_u_2_ssd_connection/1), Jul. 2016, retrieved Apr. 12, 2021, 5 pages.
Office Action for U.S. Appl. No. 15/403,088, dated Jun. 7, 2018.
Wikipedia, "SATA Express," (https://en.wikipedia.org/wiki/SATA_Express), retrieved Apr. 12, 2021, 6 pages.
Wikipedia, "U.2," (https://en.wikipedia.org/wiki/U.2), retrieved Apr. 12, 2021, 2 pages.
Corrected Notice of Allowability for U.S. Appl. No. 15/345,509, dated Dec. 10, 2021.
Corrected Notice of Allowability for U.S. Appl. No. 16/692,997, dated Jun. 18, 2020.
Corrected Notice of Allowability for U.S. Appl. No. 16/844,995, dated Dec. 9, 2021.
Corrected Notice of Allowability for U.S. Appl. No. 16/950,624, dated Jul. 16, 2021.
Corrected Notice of Allowability for U.S. Appl. No. 16/950,624, dated Jun. 10, 2021.
Final Office Action for U.S. Appl. No. 16/211,923, dated Aug. 19, 2019.
Final Office Action for U.S. Appl. No. 16/692,997, dated Mar. 26, 2020.
Final Office Action for U.S. Appl. No. 17/063,501, dated Nov. 2, 2021.
Final Office Action for U.S. Appl. No. 17/063,507, dated Nov. 22, 2021.
Notice of Allowance for U.S. Appl. No. 16/211,923, dated Sep. 13, 2019.
Notice of Allowance for U.S. Appl. No. 16/692,997, dated Jun. 1, 2020.
Notice of Allowance for U.S. Appl. No. 16/950,624, dated May 10, 2021.
OC3D, "What is the New U.2 SSD Connection?" OC3D News, Jul. 2016, (https://www.overclock3d.net/news/storage/what_is_the_new_u_2_ssd_connection/1), retrieved May 2018, 4 pages.
Office Action for U.S. Appl. No. 16/202,079, dated Dec. 9, 2021.
Office Action for U.S. Appl. No. 16/211,923, dated May 6, 2019.
Office Action for U.S. Appl. No. 16/692,997, dated Dec. 19, 2019.
Office Action for U.S. Appl. No. 16/950,624, dated Jan. 25, 2021.
Office Action for U.S. Appl. No. 17/063,501, dated Jul. 15, 2021.
Office Action for U.S. Appl. No. 17/063,507, dated Aug. 6, 2021.
SSD Form Factor Work Group, "Enterprise SSD Form Factor 1.0a", 2012, SSD Form Factor Work Group, pp. 1-55. (Year: 2012).
Wikipedia, "SATA Express", (https://en.wikipedia.org/wiki/SATA_Express), retrieved May 2018, 6 pages.
Wikipedia, "U.2", (https://en.wikipedia.org/wiki/U.2), retrieved May 2018, 3 pages.
Corrected Notice of Allowability for U.S. Appl. No. 15/345,509, dated Aug. 30, 2021.
Corrected Notice of Allowability for U.S. Appl. No. 15/345,509, dated Oct. 27, 2021.
Corrected Notice of Allowability for U.S. Appl. No. 16/202,079, dated Sep. 15, 2021.
Corrected Notice of Allowability for U.S. Appl. No. 16/857,172, dated Aug. 20, 2021.
Corrected Notice of Allowability for U.S. Appl. No. 16/921,923, dated Aug. 24, 2021.
Notice of Allowance for U.S. Appl. No. 16/844,995, dated Sep. 29, 2021.
Office Action for U.S. Appl. No. 17/099,776, dated Sep. 24, 2021.
Notice of Allowance for U.S. Appl. No. 15/345,509, dated Feb. 8, 2022.

(56) References Cited

OTHER PUBLICATIONS

Notice of Allowance for U.S. Appl. No. 16/202,079, dated Mar. 17, 2022.
Notice of Allowance for U.S. Appl. No. 17/099,776, dated Feb. 15, 2022.
Office Action for U.S. Appl. No. 16/844,995, dated Feb. 22, 2022.
Office Action for U.S. Appl. No. 17/063,501, dated Feb. 24, 2022.
Office Action for U.S. Appl. No. 17/063,507, dated Mar. 17, 2022.
Corrected Notice of Allowability for U.S. Appl. No. 15/345,509, dated Jun. 10, 2022.
Notice of Allowance for U.S. Appl. No. 17/063,501, dated Jun. 2, 2022.
Supplemental Notice of Allowability for U.S. Appl. No. 17/099,776, dated May 16, 2022.
Corrected Notice of Allowability for U.S. Appl. No. 15/345,509, dated Jun. 27, 2022.
Corrected Notice of Allowability for U.S. Appl. No. 16/202,079, dated Jul. 7, 2022.
Corrected Notice of Allowability for U.S. Appl. No. 17/063,501, dated Jul. 7, 2022.
Corrected Notice of Allowability for U.S. Appl. No. 17/063,501, dated Jun. 23, 2022.
Corrected Notice of Allowability for U.S. Appl. No. 17/099,776, dated Jun. 20, 2022.
Final Office Action for U.S. Appl. No. 17/063,507, dated Jun. 27, 2022.
Corrected Notice of Allowability for U.S. Appl. No. 15/345,509, dated Aug. 8, 2022.
Corrected Notice of Allowability for U.S. Appl. No. 16/202,079, dated Aug. 17, 2022.
Corrected Notice of Allowability for U.S. Appl. No. 17/063,501, dated Jul. 27, 2022.
Corrected Notice of Allowability for U.S. Appl. No. 17/099,776, dated Jul. 21, 2022.
Office Action for U.S. Appl. No. 17/408,365, dated Aug. 2, 2022.
Corrected Notice of Allowability for U.S. Appl. No. 15/345,509, dated Sep. 7, 2022.
Corrected Notice of Allowability for U.S. Appl. No. 16/202,079, dated Aug. 31, 2022.
Corrected Notice of Allowability for U.S. Appl. No. 16/844,995, dated Oct. 20, 2022.
Corrected Notice of Allowability for U.S. Appl. No. 17/063,501, dated Aug. 24, 2022.
Corrected Notice of Allowability for U.S. Appl. No. 17/063,501, dated Oct. 13, 2022.
Corrected Notice of Allowability for U.S. Appl. No. 17/099,776, dated Aug. 24, 2022.
Corrected Notice of Allowability for U.S. Appl. No. 17/099,776, dated Oct. 19, 2022.
Notice of Allowance for U.S. Appl. No. 16/844,995, dated Aug. 26, 2022.
Notice of Allowance for U.S. Appl. No. 17/063,507, dated Oct. 7, 2022.
Office Action for U.S. Appl. No. 17/230,989, dated Oct. 31, 2022.
Office Action for U.S. Appl. No. 17/376,145, dated Sep. 30, 2022.
Corrected Notice of Allowability for U.S. Appl. No. 17/063,501, dated Nov. 21, 2022.
Corrected Notice of Allowability for U.S. Appl. No. 17/063,507, dated Nov. 30, 2022.
Corrected Notice of Allowability for U.S. Appl. No. 17/099,776, dated Nov. 30, 2022.
Corrected Notice of Allowability for U.S. Appl. No. 16/844,995, dated Jan. 19, 2023.
Corrected Notice of Allowability for U.S. Appl. No. 17/063,507, dated Jan. 17, 2023.
Final Office Action for U.S. Appl. No. 17/408,365, dated Dec. 27, 2022.
Office Action for U.S. Appl. No. 16/202,079, dated Feb. 2, 2023.
Office Action for U.S. Appl. No. 17/868,734, dated Feb. 14, 2023.
Corrected Notice of Allowability for U.S. Appl. No. 16/844,995, dated Oct. 12, 2023.
Corrected Notice of Allowability for U.S. Appl. No. 17/063,507, dated Sep. 27, 2023.
Corrected Notice of Allowability for U.S. Appl. No. 17/376,145, dated Oct. 12, 2023.
Final Office Action for U.S. Appl. No. 17/230,989, dated Sep. 26, 2023.
Notice of Allowance for U.S. Appl. No. 17/408,365, dated Sep. 19, 2023.
Supplemental Notice of Allowability for U.S. Appl. No. 17/099,776, dated Sep. 27, 2023.
Supplemental Notice of Allowability for U.S. Appl. No. 17/408,365, dated Sep. 28, 2023.
Supplemental Notice of Allowability for U.S. Appl. No. 17/868,734, dated Sep. 25, 2023.
Corrected Notice of Allowability for U.S. Appl. No. 16/844,995, dated Mar. 15, 2023.
Corrected Notice of Allowability for U.S. Appl. No.16/844,995, dated Mar. 22, 2023.
Corrected Notice of Allowability for U.S. Appl. No. 16/844,995, dated May 5, 2023.
Corrected Notice of Allowability for U.S. Appl. No. 17/063,507, dated Mar. 1, 2023.
Final Office Action for U.S. Appl. No. 17/408,365, dated Apr. 18, 2023.
Office Action for U.S. Appl. No. 17/099,776, dated Apr. 17, 2023.
Corrected Notice of Allowability for U.S. Appl. No. 16/844,995, dated Jun. 30, 2023.
Corrected Notice of Allowability for U.S. Appl. No. 16/844,995, dated Jun. 7, 2023.
Corrected Notice of Allowability for U.S. Appl. No. 17/063,507, dated Jun. 1, 2023.
Corrected Notice of Allowability for U.S. Appl. No. 17/063,507, dated Jun. 20, 2023.
Final Office Action for U.S. Appl. No. 17/230,989, dated Jun. 28, 2023.
Notice of Allowance for U.S. Appl. No. 17/376,145, dated Jun. 20, 2023.
Notice of Allowance for U.S. Appl. No. 17/868,734, dated Jul. 6, 2023.
Corrected Notice of Allowability for U.S. Appl. No. 16/844,995, dated Sep. 5, 2023.
Corrected Notice of Allowability for U.S. Appl.No. 17/063,507, dated Aug. 16, 2023.
Corrected Notice of Allowability for U.S. Appl. No. 17/376,145, dated Aug. 28, 2023.
Notice of Allowance for U.S. Appl. No.17/099,776, dated Aug. 8, 2023.
Supplemental Notice of Allowability for U.S. Appl. No. 17/099,776, dated Aug. 17, 2023.
Supplemental Notice of Allowability for U.S. Appl. No. 17/868,734, dated Aug. 14, 2023.
Corrected Notice of Allowability for U.S. Appl. No. 16/844,995, dated Nov. 27, 2023.
Corrected Notice of Allowability for U.S. Appl. No. 17/063,507, dated Nov. 13, 2023.
Corrected Notice of Allowability for U.S. Appl. No. 17/376,145, dated Dec. 8, 2023.
Corrected Notice of Allowability for U.S. Appl. No. 17/868,734, dated Nov. 27, 2023.
Supplemental Notice of Allowability for U.S. Appl. No. 17/099,776, dated Nov. 16, 2023.
Supplemental Notice of Allowability for U.S. Appl. No. 17/408,365, dated Nov. 24, 2023.

* cited by examiner

MODULAR SYSTEM (SWITCH BOARDS AND MID-PLANE) FOR SUPPORTING 50G OR 100G ETHERNET SPEEDS OF FPGA+SSD

RELATED APPLICATION DATA

This application is a continuation of U.S. patent application Ser. No. 16/202,079, filed Nov. 27, 2018, now allowed, which is a continuation-in-part of U.S. patent application Ser. No. 15/256,495, filed Sep. 2, 2016, which claims the benefit of U.S. Provisional Patent Application Ser. No. 62/366,622, filed Jul. 26, 2016, both of which are incorporated by reference herein for all purposes.

U.S. patent application Ser. No. 16/202,079, filed Nov. 27, 2018, now allowed, claims the benefit of U.S. Provisional Patent Application Ser. No. 62/638,040, filed Mar. 2, 2018, which is incorporated by reference herein for all purposes.

U.S. patent application Ser. No. 16/202,079, filed Nov. 27, 2018, now allowed, claims the benefit of U.S. Provisional Patent Application Ser. No. 62/745,967, filed Oct. 15, 2018, which is incorporated by reference herein for all purposes.

FIELD

The inventive concepts relate generally to computer systems, and more particularly to computer systems and storage devices capable of supporting multiple speeds of communication.

BACKGROUND

The current preferred connection interface for Solid State Drives (SSDs) is the U.2 connector. The U.2 connector is an interface that supports both Peripheral Component Interconnect Express (PCIe) and Serial Attached Small Computer Systems Interface (SAS) connections with the host computer. PCIe communications using the PCIe generation 3 standard support 8 Giga Transfers (GT) per second per PCIe lane, and the U.2 connector supports 4 PCIe lanes. This means that an SSD can theoretically send more than 25 Gb/second: greater than the bandwidth of an Ethernet port of the device and an Ethernet switch on the motherboard. With PCIe generation 4, this speed mismatch becomes worse: the SSD is capable of sending data much faster than the device's Ethernet port and the Ethernet switch are capable of receiving and processing it. Thus, the Ethernet switch on the motherboard may become a bottleneck in data transmission.

A need remains for a way for a fabric-attached storage device to support high data transmission rates without the Ethernet switch becoming a bottleneck.

DETAILED DESCRIPTION

Figure 1:
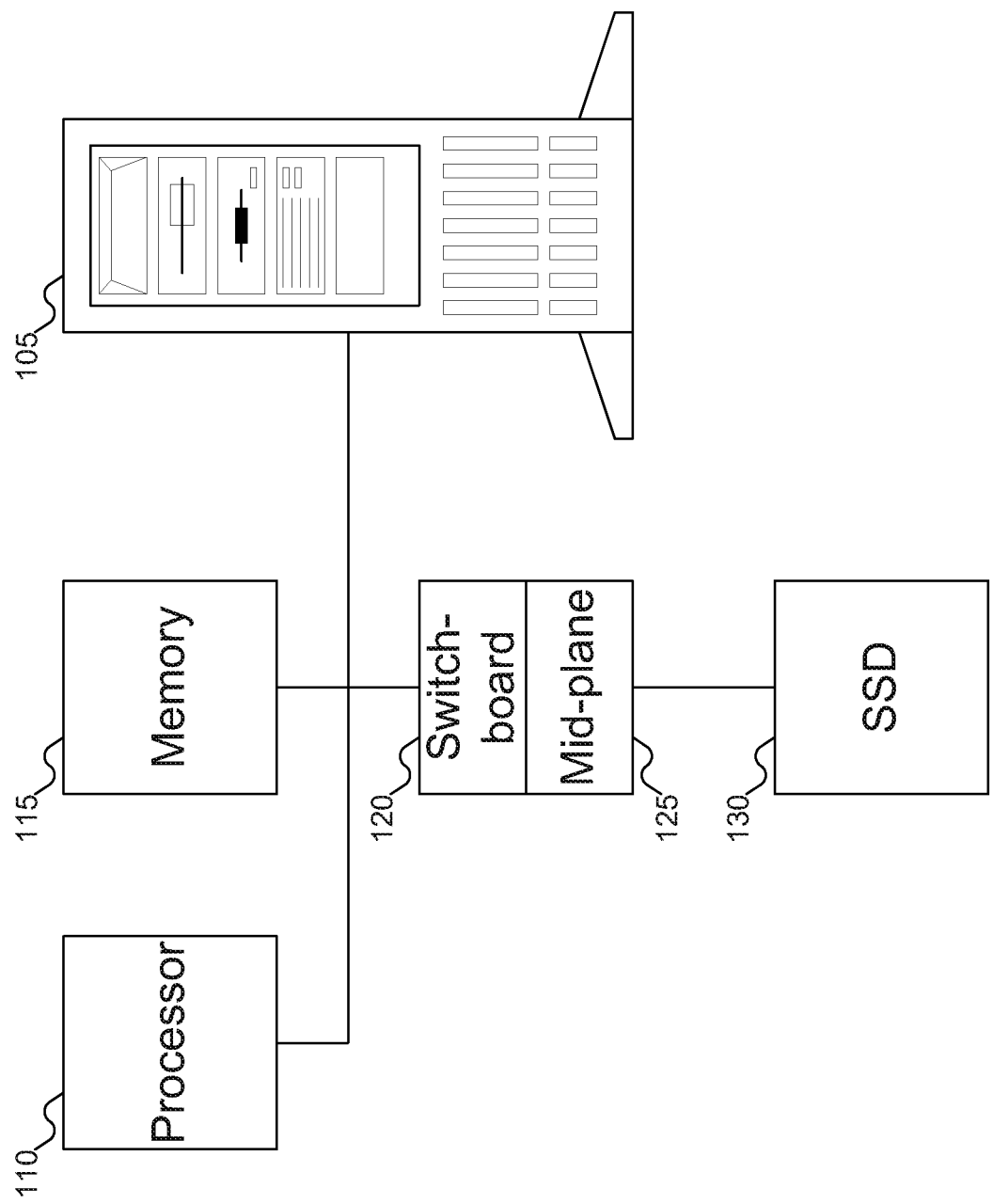
FIG. 1 shows a machine including a front-end and storage device capable of supporting multiple speeds, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Ethernet Solid State Drives (SSDs) may use the U.2 connector to interface with the system via the mid-plane. The U.2 connector may support Ethernet at speeds up to 25 Gbps.

A multi-mode Non-Volatile Memory Express (NVMe) over Fabric (NVMeoF) device may support either NVMe or NVMeoF by detecting information from a known location (for example, as described in parent U.S. patent application Ser. No. 15/256,495, filed Sep. 2, 2016, incorporated by reference herein for all purposes). If a multi-mode NVMeoF device is present in an NVMe chassis, then the X4 Peripheral Component Interconnect Express (PCIe) lanes of the U.2 connector will be driven by the PCI-e engine. In this case, the device will disable the Ethernet engine(s) and all NVMe protocols and functionalities are supported or enabled. If the multi-mode NVMeoF device is present in an NVMeoF chassis, then the Ethernet ports will use only the unused SAS pins. Note that as of this filing, there is no standard implementation specified by the NVMe.org.

Even with PCIe generation 3, the multi-mode NVMeoF device is capable of transmitting data faster than a 25 Gbps Ethernet switch may process. With the advent of PCIe generation 4, the bandwidth mismatch is even greater. A single 25 Gbps Ethernet port/switch does not have enough peak bandwidth to keep up with the backend by X4 PCIe generation 4 lanes (up to 8 GB/second) from the SSD.

One solution is to install a faster Ethernet switch, such as a 50 Gbps or 100 Gbps Ethernet switch, which may handle the throughput from the multi-mode NVMe device. But many existing systems with 25 Gbps Ethernet switches already exist, and multi-mode NVMeoF devices will likely be installed in such systems. Upgrading the Ethernet switch of the host system is a non-trivial undertaking, and might require taking the host system off-line to perform the upgrade, which may be undesirable for other reasons (for example, the system would be unavailable during the downtime).

Another solution is to have different models of devices appropriate for systems of varying Ethernet speeds. But this solution leads to a multiplicity of device offerings, further complicating the choice of an appropriate device. With the desire to simplify the number of device offerings (hence the introduction of the multi-mode NVMeoF device, eliminating the need to select between NVMe and NVMeoF devices), having different devices that operate at different Ethernet speeds is also undesirable. This problem is magnified by the existence of multiple NVMeoF device suppliers.

Therefore, the desirable solution is a flexible NVMeoF system consisting of switchboard and mid-plane which are capable of supporting of different Ethernet speeds from 10 Gbps up to 100 Gbps, and that support both U.2 and future connectors, such as M.3 and SFF-TA-1008. The architecture should be able to keep up with technologies advancement such as 50 Gbps and 100 Gbps Ethernet as well as PCIe generation 4 and beyond.

An embodiment of the inventive concept supports the above objectives by:

Having two additional General Purpose Input/Output (GPIO) pins located on the mid-plane/Complex Programmable Logic Device (CPLD), preferably controlled by a Baseboard Management Controller (BMC) or a local CPU. These pins may be mixed with Inter-Integrated Circuit (I2C) bus pins inside the CPLD and latched after Reset has been asserted. Alternatively, the multi-mode NVMeoF device may have an internal register inside a Field Programmable Gate Array (FPGA) that may be accessed via an I2C bus.

Instead of using two X2 PCIe lanes as the control plane, using only two X1 PCIe lanes. This choice frees up 2 more PCIe lanes which can be used for additional Ethernet ports.

Enabling an external device, such as the BMC or local CPU, to configure and select the appropriate Ethernet speed.

Using a standard U.2 connector to support a single 100 Gbps Ethernet connection between device and switch.

Using the same mid-plane for both 50 Gbps (either in a High Availability (HA) system or a non-HA system) and 100 Gbps (in a non-HA configuration). There may be two versions of the switchboard: 50 Gbps and 100 Gbps.

In an embodiment of the inventive concept:

Common NVMeoF device with two distinct modes: NVMe or NVMeoF (U.2 pin E6 vendor-defined pin as Chassis Type may be used to determine the appropriate mode).

In NVMe mode, the device will behave as an NVMe device. All Ethernet ports are disabled.

If NVMeoF mode, the device will use SAS pins and PCIe lanes for Ethernet ports (depending on selected mode).

In NVMeoF Mode:

In non HA mode, the device will used X1 (instead of X2) PCIe lanes for all standard features as control plane.

In HA (dual-port) mode, two X1 PCIe will be used for port A and port B respectively.

The existing PCI-e software driver may be used as-is for the NVMeoF products.

The device may support Next Generation SFF (M.3) SSDs and U.2 based SSDs.

The switchboard may be used in both 1U and 2U chassis platforms.

The mid-plane may be used to support U.2-based NVMe SSDs such as PM1725a, M.2, and NF1-based SSDs.

Advantages of embodiments of the inventive concept include:

Lower cost per NVMeoF unit due to economy of scales (i.e., same device can be used as NVMe or NVMeoF).

Versatile NVMeoF devices which can be used in many products/chassis.

Using X1 PCIe lanes for all standard features as control plane.

CPU, BMC and other devices may use the X1 PCIe lane as control plane to communicate to each NVMeoF device inside the chassis at no additional cost.

The same mid-plane may be used for both NVMe or NVMeoF based chassis.

Faster time-to-market and lower development risks.

Performance scales linearly.

More SSDs per SFF/slot.

Ethernet speeds may scale up to match the PCIe bandwidth of SSDs.

Standard U.2 connector and SFF.

Table 1 illustrates how speed pins may be used to specify the different Ethernet speeds of the chassis. Table 2 illustrates how the various pins on a connector, such as U.2, may be used to communicate data with the mid-plane and switch.

TABLE 1

| Ethernet Speed | ESpeed Pin 1 | ESpeed Pin 0 | U.2 DualPortEn# | U.2 PRSNT# | U.2 IfDet# |
|---|---|---|---|---|---|
| 10 Gbps | Hi | Hi | Standard definition | Standard definition | Standard definition |
| 25 Gbps | Hi | Lo | Standard definition | Standard definition | Standard definition |
| 50 Gbps | Lo | Hi | Standard definition | Standard definition | Standard definition |
| 100 Gbps | Lo | Lo | Standard definition | Standard definition | Standard definition |

TABLE 2

| Ethernet Mode | SAS0 | SAS1 | PCIe0 | PCe1 | PCIe2 | PCIe3 | Chassis Type Pin E6 (lo = NVMe, hi = NVMeoF) |
|---|---|---|---|---|---|---|---|
| Not enabled | Not used | Not used | Used as single X4 | Used as single X4 | Used as single X4 | Used as single X4 | NVMe |
| 10 Gbps (single and dual port) | Ethernet A | | Control Port A X1 | Ethernet B | | Control Port B X1 | NVMeoF |
| 25 Gbps (single and dual port) | Ethernet A | | Control Port A X1 | Ethernet B | | Control Port B X1 | NVMeoF |
| 50 Gbps (single and dual port) | Ethernet A | Ethernet C | Control Port A X1 | Ethernet B | Ethernet D | Control Port B X1 | NVMeoF |
| 100 Gbps (single port only) | Ethernet A | Ethernet C | Control Port A X1 | Ethernet B | Ethernet D | Control Port B X1 | NVMeoF |

FIG. 1 shows a machine including a front-end and storage device capable of supporting multiple speeds, according to an embodiment of the inventive concept. In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination.

Machine 105 may also include memory 115, which may be managed by a memory controller (not shown). Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types.

Machine 105 may also include a front-end, which may include switchboard 120 and mid-plane 125. The front-end may act as an interface to storage devices, such as Solid State Drive (SSD) 130. Depending on the embodiment of the inventive concept, the front-end may include one switchboard 120 or two switchboards.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines.

Figure 2:
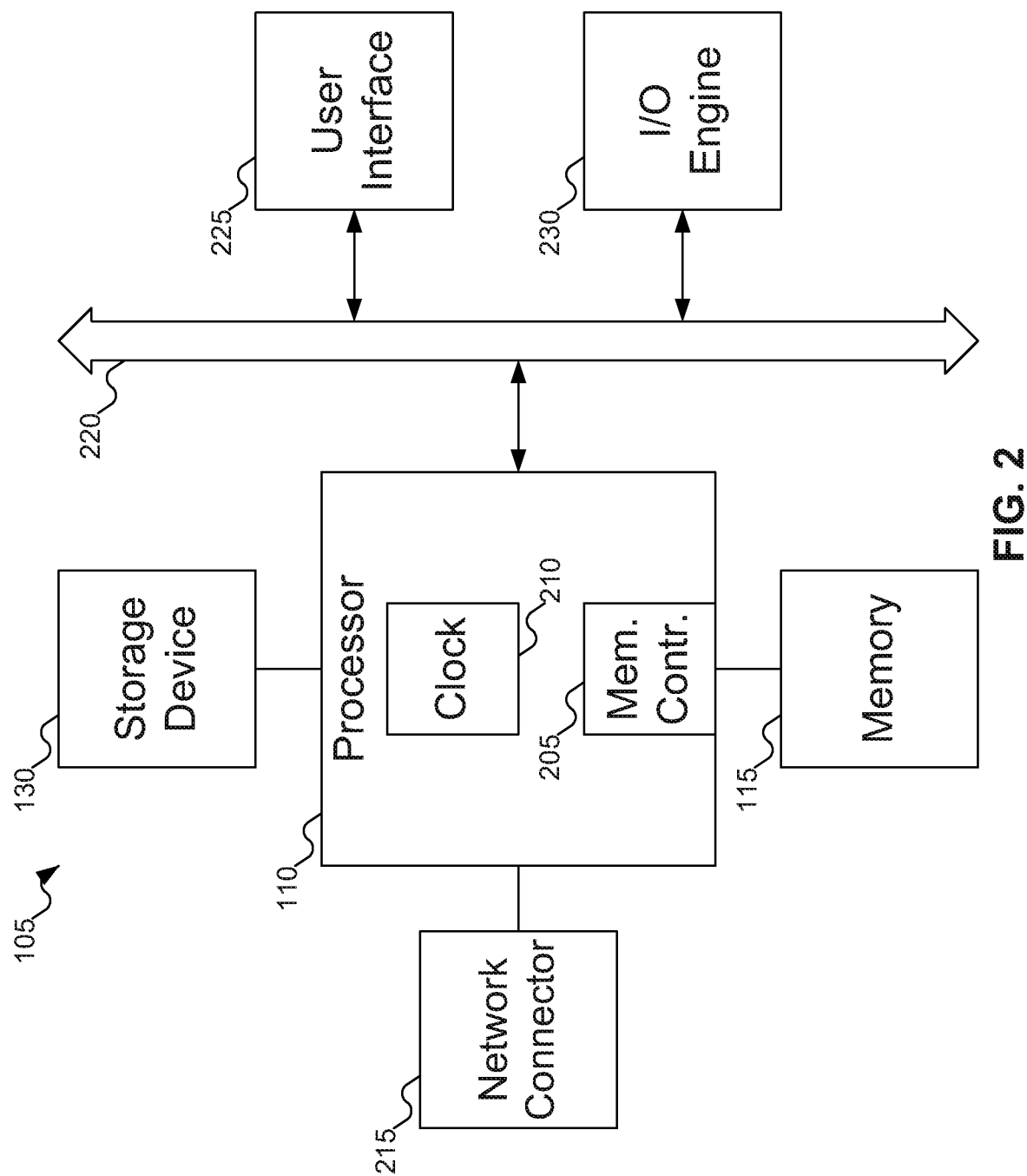
FIG. 2 shows additional details of the machine of FIG. 1.

FIG. 2 shows additional details of the machine of FIG. 1. In FIG. 2, typically, machine 105 includes one or more processors 110, which may include memory controllers 205 and clocks 210, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 130, and to network connector 215, which may be, for example, an Ethernet connector or a wireless connector. Processors 110 may also be connected to buses 220, to which may be attached user interfaces 225 and Input/Output interface ports that may be managed using Input/Output engines 230, among other components.

Figure 3:
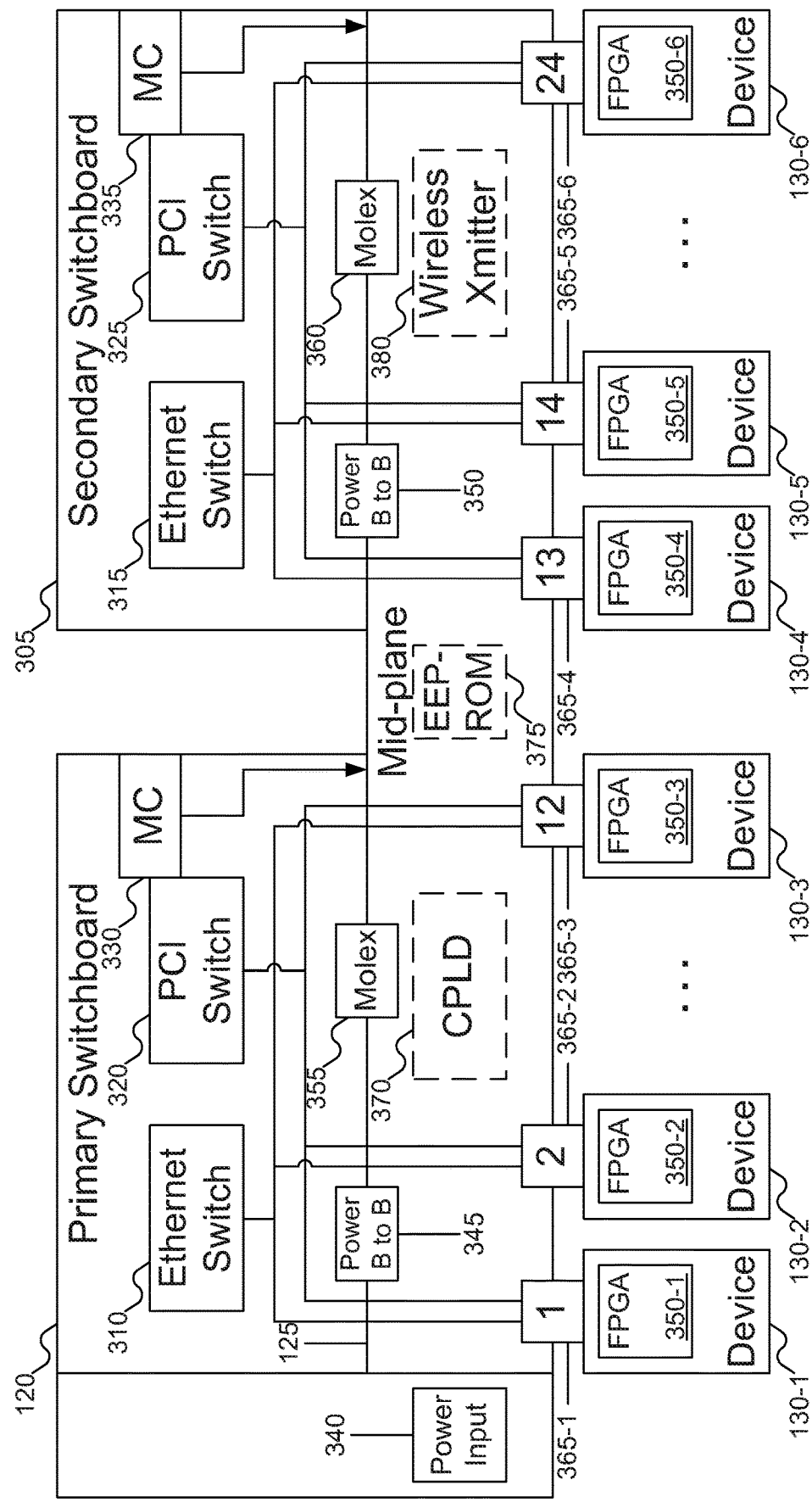
FIG. 3 shows a front-end including two switchboards and a shared mid-plane connecting to storage devices in the machine of FIG. 1.

FIG. 3 shows a front-end including two switchboards and a shared mid-plane 125 connecting to storage devices in machine 105 of FIG. 1, according to one embodiment of the inventive concept. The embodiment shown in FIG. 3, with two switchboards 120 and 305, may be thought of as a dual-port, or High Availability (HA) implementation. In an HA implementation, any given storage device may communicate with either switchboard. In this manner, should one switchboard fail or begin to function incorrectly, the storage device may receive communications using the other switchboard.

In FIG. 3, mid-plane 125 connects to two switchboards 120 and 305. Switchboards 120 and 305 may be thought of as "primary" and "secondary" switchboards, as labeled in FIG. 3, but the labelling should not be interpreted to mean that all communications with the storage device pass through primary switchboard 120 unless primary switchboard 120 does not function correctly. Each of switchboards 120 and 305 may manage any number of storage devices as the "primary" switchboard for that storage device. For example, FIG. 3 shows that switchboards 120 and 305 may support a total of 24 storage devices (of which six storage devices 130-1, 130-2, 130-3, 130-4, 130-5, and 130-6 are shown): each of switchboards 120 and 305 may support 24 storage devices. Ethernet Port A and Control Port A of storage devices 1-24 may communicate with switchboard 120, and Ethernet Port B and Control Port B of storage devices 1-24 may communicate with switchboard 305. While the above discussion centers on two Ethernet Ports of storage devices 130-1 through 130-6, if more Ethernet ports are needed storage devices 130-1 through 130-6 may communicate with switchboards 120 and 305 using multiple Ethernet Ports.

In the example embodiment of the inventive concept shown in FIG. 3, devices 130-1 through 130-6 may use Ethernet as a data plane and Peripheral Component Interconnect Express (PCIe) as a control plane, but other embodiments of the inventive concept may support other communication modes for either the data plane or the control plane.

Storage devices 130-1 through 130-6 may be multi-mode devices: for example, storage devices 130-1 through 130-6 may each support interfaces using either Non-Volatile Memory Express (NVMe) or NVMe over Fabric (NVMeoF), depending on the chassis in which storage devices 130-1 through 130-6 are installed. For more information about multi-mode devices, U.S. patent application Ser. No. 15/411,962, filed Jan. 20, 2017, which claims the benefit of U.S. Provisional Patent Application Ser. No. 62/426,422, filed Nov. 25, 2016; U.S. patent application Ser. No. 15/256,495, filed Sep. 2, 2016, which claims the benefit of U.S. Provisional Patent Application Ser. No. 62/366,622, filed Jul. 26, 2016; U.S. patent application Ser. No. 15/345,507, filed Nov. 7, 2016, which claims the benefit of U.S. Provisional Patent Application Ser. No. 62/394,726, filed Sep. 14, 2016; U.S. patent application Ser. No. 15/345,509, filed Nov. 7, 2016, which claims the benefit of U.S. Provisional Patent Application Ser. No. 62/394,727, filed Sep. 14, 2016; and U.S. patent application Ser. No. 15/403,008, filed Jan. 10, 2017, which claims the benefit of U.S. Provisional Patent Application Ser. No. 62/420,355, filed Nov. 10, 2016, all of which are incorporated by reference herein, may be examined.

Each switchboard 120 and 305 may include Ethernet switch 310 and 315, PCI switch 320 and 325, and management controller 330 and 335, which may be Baseboard Management Controllers (BMCs). As described above, Ethernet switches 310 and 315 and PCI switches 320 and 325 may be used to manage communication with storage devices 130-1 through 130-6; management controllers 330 and 335 may monitor the operation of components within machine 105 of FIG. 1 (although typically only one of management controllers 330 and 335 will monitor storage devices 130-1 through 130-6 at one time). Currently, most Ethernet switches 310 and 315 support speeds up to 25 Gbps, but future Ethernet switches may support 50 Gbps or 100 Gbps (or potentially even greater) speeds.

To enable embodiments of the inventive concept, management controllers 330 and 335 may talk with any of devices in machine 105 of FIG. 1. In particular, management controllers 330 and 335 may inform components on mid-plane 125 of the Ethernet speed supported by Ethernet switches 310 and 315, so that mid-plane 125 may inform storage devices 130-1 through 130-6 of the Ethernet speeds, as described below.

Mid-plane 125 may include power input 340 containing alternating current (AC) power supply units. Using Power Board to Board units 345 and 350, mid-plane 125 may provide power to switchboards 120 and 305. Mid-plane 125 and switchboards 120 and 305 may also be connected using other connectors, such as Molex connectors 355 and 360, which support communication between switchboards 120 and 305 (and components thereon) and storage devices 130-1 through 130-6.

Mid-plane 125 may also include storage device connectors 365-1, 365-2, 365-3, 365-4, 365-5, and 365-6, each supporting connection to a storage device, such as storage devices 130-1, 130-2, 130-3, 130-4, 130-5, and 130-6, respectively. Storage device connectors 365-1 through 365-6 may be any desired storage device connector including, for example, U.2 and SFF-TA-1008 connectors. Storage device connectors 365-1 through 365-6 supported by mid-plane 125 may all be the same type of connector, or they may be different types of connectors. Thus, the communication path for requests coming from host processor 110 of FIG. 1 may be through switchboards 120 or 305 (depending on which switchboard is the "primary" for the storage device in question), then through the connector to mid-plane 125, and then through the appropriate storage device connector 365-1 through 365-6.

Mid-plane 125 may also include any (or all) of Complex Programmable Logic Device (CPLD) 370, Electrically Erasable Programmable Read Only Memory (EEPROM) 375, and wireless transmitter 380. CPLD 370, EEPROM 375, and wireless transmitter 380 provide various mechanisms for storage devices 130-1 through 130-6 to be informed of the Ethernet speed of machine 105 of FIG. 1.

In one variation, CPLD 370 may be used to inform storage devices 130-1 through 130-6 of the Ethernet speed of the front-end. CPLD 370 may use one or more pins on storage device connectors 365-1 through 365-6 to provide this information. For example, CPLD 370 may use one or more reserved pins on storage device connectors 365-1 through 365-6 to communicate the Ethernet speed of the front-end. Alternatively, CPLD 370 may use one or more general purpose Input/Output (GPIO) pins on storage device connectors 365-1 through 365-6 to communicate the Ethernet speed of the front-end by muxing the Ethernet speed pins with other pins in CPLD 370, such as Inter-Integrated Circuit (I2C) pins. After transmitting the Ethernet speed, the Ethernet speed pins may be latched after a reset.

In one embodiment of the inventive concept, as shown above in Tables 1 and 2, there are four possible Ethernet speeds: 10 Gbps, 25 Gbps, 50 Gbps, and 100 Gbps. To represent four possible values, two pins may be used in parallel to represent all four possible values. If the number of Ethernet speeds increases beyond four, then additional Ethernet speed pins may be needed to transmit all possible values. In general, given n possible Ethernet speeds, the number of pins needed to transmit all possible values at one time may be calculated as $\lceil \log_2 n \rceil$.

Alternatively, fewer than $\lceil \log_2 n \rceil$ pins may be used, if some pins are used to send bits serially. For example, with the above example of four Ethernet speeds, one bit may be used to transmit all four possible values by sending two bits over the same pin, but at different times.

In another embodiment of the inventive concept, storage devices 130-1 through 130-6 may include Field Programmable Gate Arrays (FPGAs) 350-1, 350-2, 350-3, 350-4, 350-5, and 350-6, respectively. FPGAs 350-1 through 350-6 may be replaced with functionally equivalent structures as appropriate. FPGAs 350-1 through 350-6 may manage which pins on storage device connectors 365-1 through 365-6 are used to handle which data, as shown for example in Table 2. FPGAs 350-1 through 350-6 may also include registers accessible by CPLD 370 over the I2C bus, and CPLD 370 may write a value into these registers, where the value represents the Ethernet speed of the front-end. For example, the least significant bit of the register may store the value that might otherwise be transmitted over Ethernet speed pin 0 (as shown in Table 2), and the next bit may store the value that might otherwise be transmitted over Ethernet speed pin 1 (as shown in Table 2).

In yet another embodiment of the inventive concept, the value representing the Ethernet speed of the front-end may be written to some storage area commonly accessible by all storage devices 130-1 through 130-6: for example, in EEPROM 375. This commonly accessible storage area may be, for example, a Vital Product Data (VPD). Then, as part of their respective boot operations, each storage device 130-1 through 130-6 may access the commonly accessible storage area (for example, over the I2C bus) and read the Ethernet speed from that storage.

In yet another embodiment of the inventive concept, mid-plane 125 may transmit the Ethernet speed of the front-end wirelessly to storage devices 130-1 through 130-6, using wireless transmitter 380. This embodiment of the inventive concept presupposes that storage devices 130-1 through 130-6 include the necessary hardware to receive the transmission from wireless transmitter 380.

In the embodiments of the inventive concept shown in FIG. 3, storage devices 130-1 through 130-6 may be using, for example, four Ethernet ports. Two Ethernet ports (that is, one half of the total number of Ethernet ports) may communicate with Ethernet switch 310 of switchboard 120, and two Ethernet ports (the other half of the total number of Ethernet ports) may communicate with Ethernet switch 315 of switchboard 305. Mid-plane 125 may manage which Ethernet ports on storage devices 130-1 through 130-6 communicate with which Ethernet switch.

Given Ethernet switches 310 and 315 as installed in switchboards 120 and 305, the maximum Ethernet speed supported by the front end may vary: different Ethernet switches may offer different bandwidths. For example, some switchboards might only support 10 Gbps Ethernet, while other switchboards might support up to 100 Gbps Ethernet. In one embodiment of the inventive concept as represented in Tables 1 and 2, the maximum Ethernet speeds may be 10 Gbps, 25 Gbps, 50 Gbps, and 100 Gbps. Thus, by interrogating Ethernet switches 310 and 315 of switchboards 120 and 305, BMCs 330 and 335 may determine the Ethernet speed of the front-end of machine 105 of FIG. 1. (Of course, there may also be other ways to determine the Ethernet speed of the front-end. For example, that information may be stored somewhere accessible to BMCs 330 and 335, such as in EEPROM 375 or some equivalent storage, as might be found in the Basic Input/Output System (BIOS) of machine 105 of FIG. 1.) Once BMCs 330 and 335 know the Ethernet speed of the front-end of machine 105 of FIG. 1, BMCs 330 and 335 may provide this information to components of mid-plane 125 for eventual provision to storage devices 130-1 through 130-6. BMCs 330 and 335 may also configure Ethernet switches 310 and 315, PCIe switches 320 and 325, and the paths data takes from storage device connectors 365-1 through 365-6, as appropriate. More information about using BMCs 330 and 335 to configure Ethernet switches 310 and 315 may be found in U.S. patent application Ser. No. 15/489,416, filed Apr. 17, 2017, which claims the benefit of U.S. Provisional Patent Application Ser. No. 62/480,670, filed Apr. 3, 2017, both which are hereby incorporated by reference.

In the above description, BMCs 330 and 335 are described as responsible for providing mid-plane 125 with the Ethernet speed of the front-end of machine 105 of FIG. 1. But in other embodiments of the inventive concept, a local processor, such as processor 110 of FIG. 1, may act similarly in lieu of BMCs 330 and 335.

As described above, in one embodiment of the inventive concept the Ethernet speed of the front-end of machine 105 of FIG. 1 might vary between 10 Gbps and 100 Gbps: future Ethernet switches may support even higher throughputs. If the SSD, the connections between the SSD and the switches, and the switches themselves each provide enough throughput to support a particular configuration (either HA or non-HA), then the system may be used in that configuration. Thus, for example, the current version of the U.2 connector includes only four PCIe lanes and two SAS lanes. Where each lane can support a maximum bandwidth of 25 Gbps, a connector would need to support a minimum of eight lanes to be used in a 100 Gbps HA system. Since the current version of the U.2 connector only includes six lanes, the current version of the U.2 connector does not provide enough throughput to support a 100 Gbps HA system, but may be used in the non-HA version of a 100 Gbps system. (Of course, if future versions of the U.2 connector, or other connectors, support higher throughputs or offer more lanes, then those connectors may be used in HA or non-HA systems even at speeds of 100 Gbps or above.)

Figure 4:
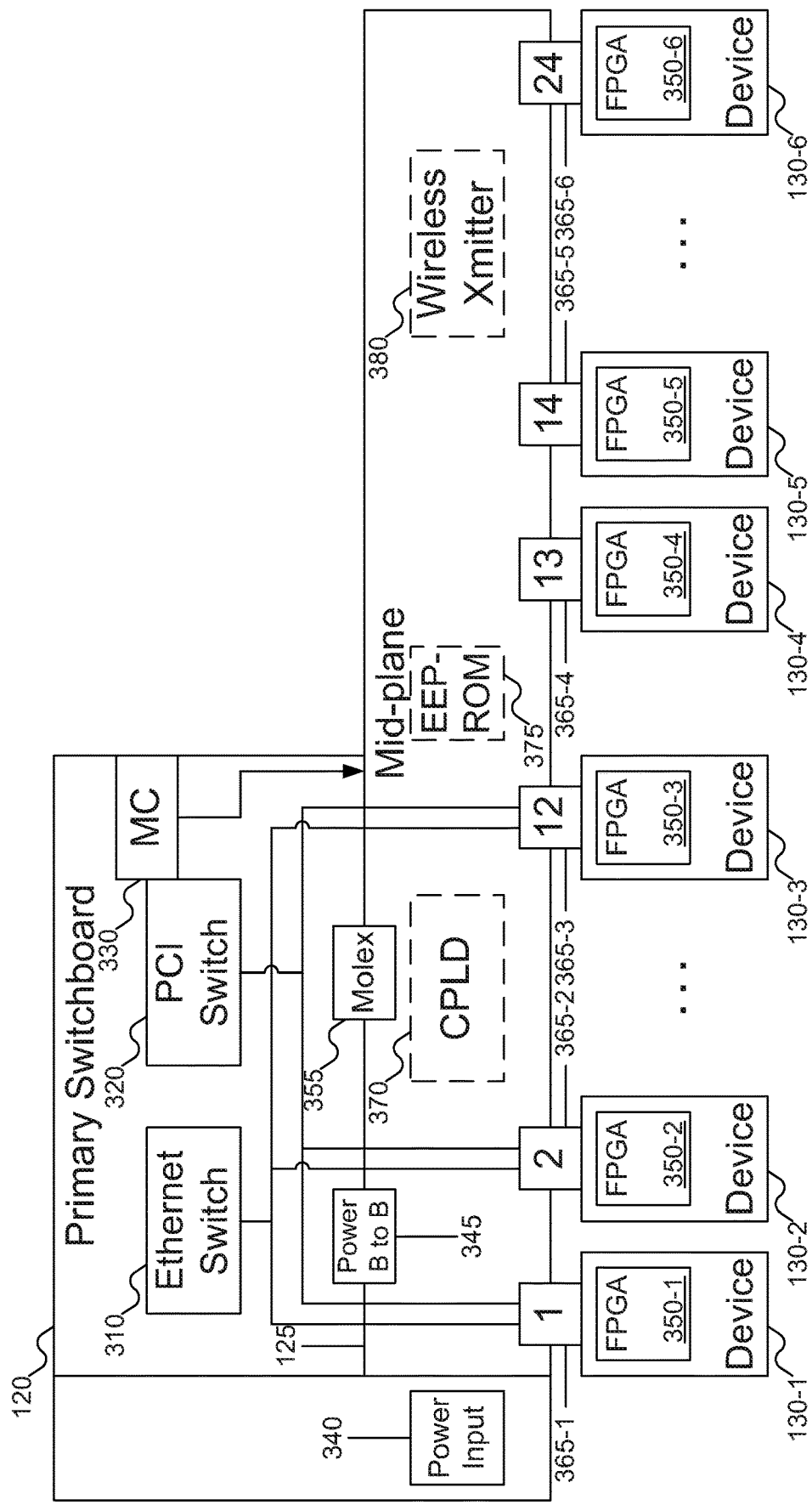
FIG. 4 shows a front-end including one switchboard and a shared mid-plane connecting to storage devices in the machine of FIG. 1.

As noted above, FIG. 3 shows a HA system with two switchboards. FIG. 4 shows a comparable non-HA implementation. In FIG. 4, switchboard 305 of FIG. 3 is absent; all Ethernet ports from the storage device route to Ethernet switch 310 on switchboard 120. Thus, if storage devices 130-1 through 130-6 support four Ethernet ports, all four Ethernet ports may be routed to Ethernet switch 310. Other than the presence or absence of switchboard 310 of FIG. 3 (and the attendant redundancies offered by switchboard 310 of FIG. 3), there is little operational difference between FIGS. 3 and 4.

Figure 5:
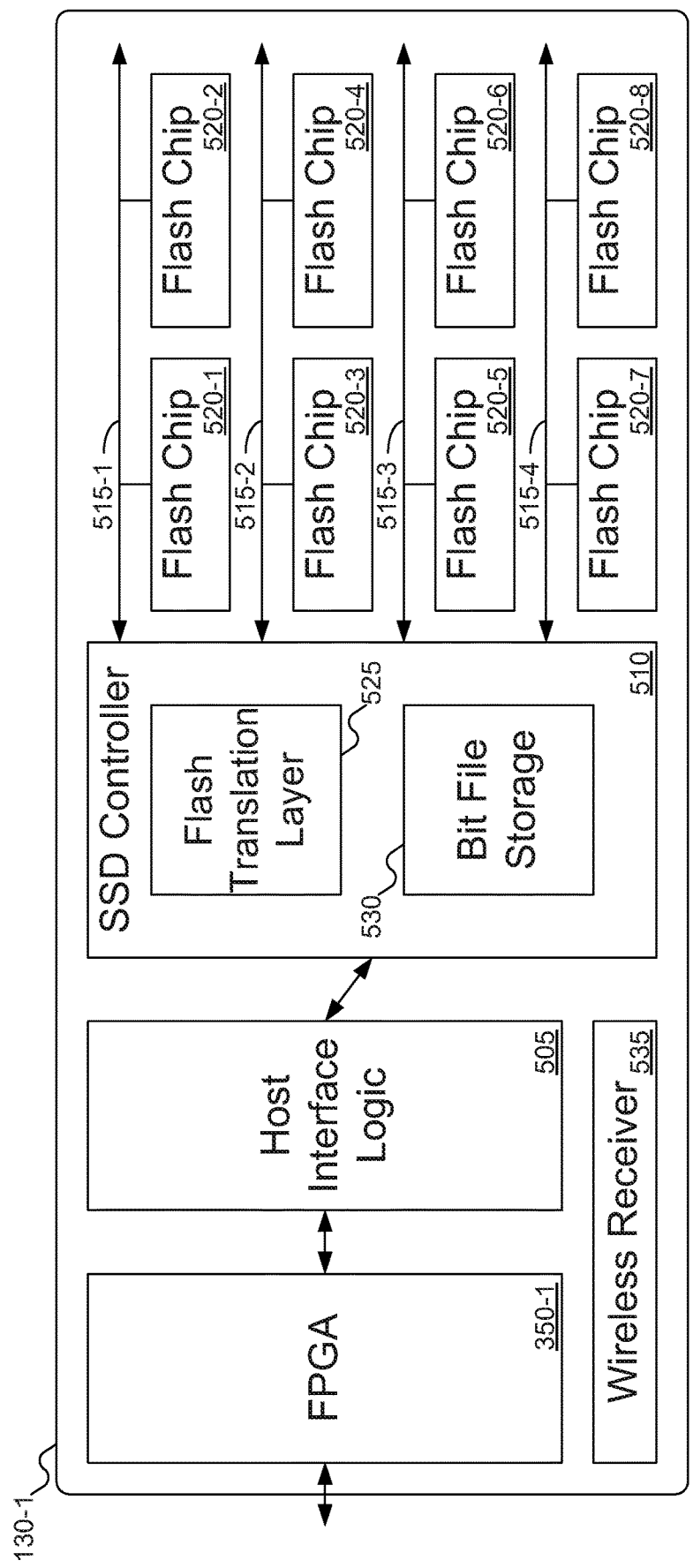
FIG. 5 shows details of the storage device of FIG. 1.

FIG. 5 shows details of storage device 130-1 of FIGS. 3-4. In FIG. 5, SSD 130-1 is shown. SSD 130-1 may include host interface logic 505, which may provide an interface between SSD 130-1 and a host computer (such as machine 105 of FIG. 1). Note that host interface logic 505 is distinct from storage device connector 365-1 through 365-6 of FIGS. 3-4: the latter represent the physical connection between mid-plane 125 of FIGS. 3-4 and storage device 130-1, whereas the former handles the protocol for communication with mid-plane 125 of FIGS. 3-4. SSD 130-1 may also include SSD controller 510, various channels 515-5, 515-2, 515-3, and 515-4, along which various flash memory chips 520-1, 520-2, 520-3, 520-4, 520-5, 520-6, 520-7, and 520-8 may be arrayed. Although FIG. 5 shows four channels and eight flash memory chips, a person skilled in the art will recognize that there may be any number of channels including any number of flash memory chips.

SSD controller 510 may include flash translation layer 525, which may handle translation of logical block addresses (as used by processor 110 of FIG. 1) and physical block addresses were data is stored in flash chips 520-1 through 520-8. SSD controller 510 may also include bit file storage 530, which may store bit files, as described further below with reference to FIG. 6.

Sitting between host interface logic 505 and storage device connector 365-1 through 365-6 of FIGS. 3-4 may be FPGA 350-1. FPGA 350-1 may handle the specific mapping of data to pins on storage device connector 365-1 through 365-6, or it may be part of a mapping logic that handles the mapping of data to pins on storage connector 365-1 through 350-6, as discussed below with reference to FIG. 6.

Finally, in embodiments of the inventive concept where storage device 130-1 receives Ethernet speed information wirelessly, storage device 130-1 may include wireless receiver 535.

FIG. 5 shows FPGA 350-1 as part of storage device 130-1. But in some embodiments of the inventive concept, the functionality of FPGA 350-1 may be part of other components of storage device 130-1: for example, the functionality of FPGA 350-1 may be part of SSD controller 510. Thus, even in embodiments of the inventive concept describing FPGA 350-1, such as FIG. 6 below, the functionality in question may be made part of other components of storage device 130-1.

Figure 6:
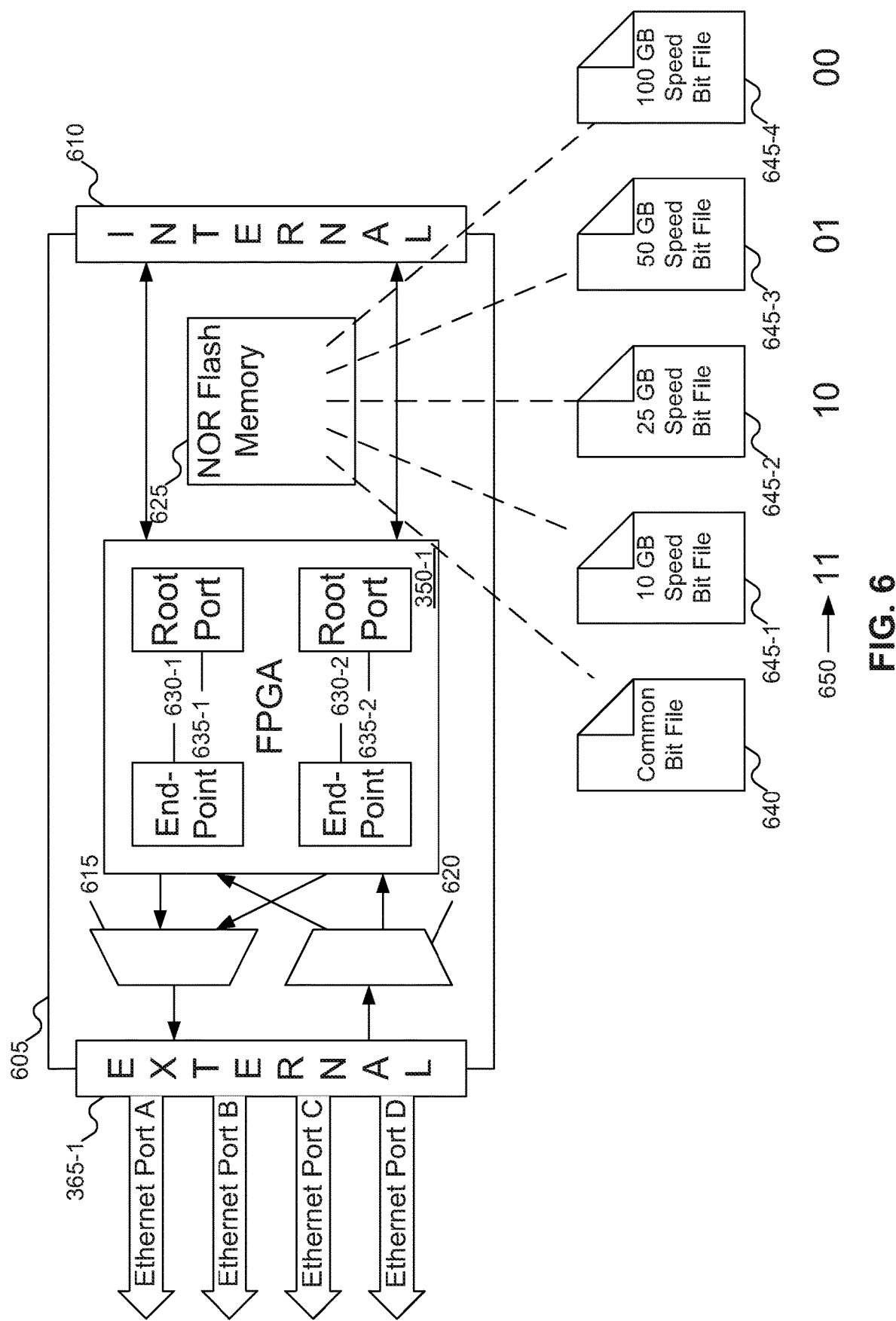
FIG. 6 shows details of a mapping logic in the storage device of FIG. 1.

FIG. 6 shows details of a mapping logic in the storage device of FIG. 1. As discussed above, mapping logic may map data to various pins on storage device connector 365-1, based on the Ethernet speed supported by the front-end of machine 105 of FIG. 1. In FIG. 6, mapping logic 605 is shown as including storage device connector 365-1, internal connector 610, multiplexer 615, demultiplexer 620, FPGA 350-1, and NOR flash memory 625. Storage device connector 365-1, as discussed above with reference to FIG. 3, provides a point of connection to mid-plane 125 of FIG. 3. Storage device connector 365-1 may also be termed an external connector, in the sense that mapping logic 605 may be part of the overall storage device yet distinct from the actual storage chips, and therefore including internal connector 610 that connects mapping logic 605 to the other components of the storage device (shown in FIG. 5).

Multiplexer 615 and demultiplexer 620 provide for the actual connection of data to pins based on the Ethernet speed. For example, consider again Table 2 above. If the storage device is operating in NVMe mode, then the four PCIe pins are used for data transmission, and the SAS pins are not used. On the other hand, if the storage device is operating in NVMeoF mode at 10 Gbps or 25 Gbps throughputs, then some data is transferred over SAS pin 0 and PCIe pins 0, 1, and 3; and if the storage device is operating in NVMeoF mode at 50 or 100 B throughputs, then additional data may also be transferred over SAS pin 1 and PCIe pin 2. But the storage device itself does not care about what data is to be transferred over which pins, so multiplexer 615 and demultiplexer 620 handle the coordination of data between external connector 615 and FPGA 350-1. FPGA 350-1 is shown as including two Endpoints 630-1 and 630-2, and two Root Ports 635-1 and 635-2, which further help to organize data flow (Endpoints 630-1 and 630-2 for communicating with external connector 615 and Root Ports 635-1 and 635-2 for communicating with internal connector 620), but embodiments of the inventive concept can support any number of Endpoints and Root Ports.

NOR flash memory 625 may store bit files, such as bit files 640, 645-1, 645-2, 645-3, and 645-4. Bit files 640 and 645-1 through 645-4 may define the operation of mapping logic 605 under various circumstances. For example, common bit file 640, which may be loaded in all circumstances, may define the operation of Endpoints 630-1 and 630-2 and Root Ports 635-1 and 635-2, whereas bit files 645-1 through 645-4 may define the operation of multiplexer 615 and demultiplexer 620 given the appropriate Ethernet speed of the front-end of machine 105 of FIG. 1. Thus, for example, if the Ethernet speed of the front-end of machine 105 of FIG. 1 is 10 Gbps, then 10 Gbps bit file 645-1 may be loaded, if the Ethernet speed of the front-end of machine 105 of FIG. 1 is 25 Gbps, then 25 Gbps bit file 645-2 may be loaded, if the Ethernet speed of the front-end of machine 105 of FIG. 1 is 50 Gbps, then 50 Gbps bit file 645-3 may be loaded, and if the Ethernet speed of the front-end of machine 105 of FIG. 1 is 100 Gbps, then 100 Gbps bit file 645-4 may be loaded. The number of bit files may vary in relation to the number of different Ethernet speeds the front-end of machine 105 may support. Note that not every Ethernet speed may require a separate bit file: for example, if multiplexer 615 and demultiplexer 620 operate identically for two (or more) Ethernet speeds, then a single bit file may be used for both Ethernet speeds.

The loading of the appropriate bit file for the Ethernet speed of the front-end of machine 105 may be handled in any desired manner. Ethernet speed bit patterns 650 show four different bit patterns corresponding to those shown for the Ethernet speed pins in Table 1: the corresponding Ethernet speed bit file may be loaded as a result. For example, Ethernet speed bit patterns 650 may be used as (or mapped to) pointers to different partitions of NOR flash memory 625 from which the bit files may be read. Any other desired approach for loading the appropriate bit file given the Ethernet speed may also be used.

FIG. 6 shows NOR flash memory 625, which offers a fast read time for data. But other storage forms may also be used in place of NOR flash memory 625, as desired: for example, NAND flash memory, or EEPROM.

While the above description suggests that common bit file 640 is read first, then one of bit files 645-1 through 645-4 is read, embodiments of the inventive concept may include reading the bit files in any desired order. In addition, a single bit file may be read. For example, if the information in common bit file 640 is included in each of bit files 645-1 through 645-4, then only one bit file need be read to load all the necessary information for mapping logic 605.

In the embodiments of the inventive concept discussed above with reference to FIGS. 3-6, PCIe switches are described as providing additional channels of communication. But embodiments of the inventive concept are not limited to PCIe switches: other switches may be used in place of a PCIe switch where appropriate. Similarly, while examples above discuss particular Ethernet speeds of between 10 Gbps and 100 Gbps, embodiments of the inventive concept may extend to other Ethernet speeds beyond these values.

Figure 7:
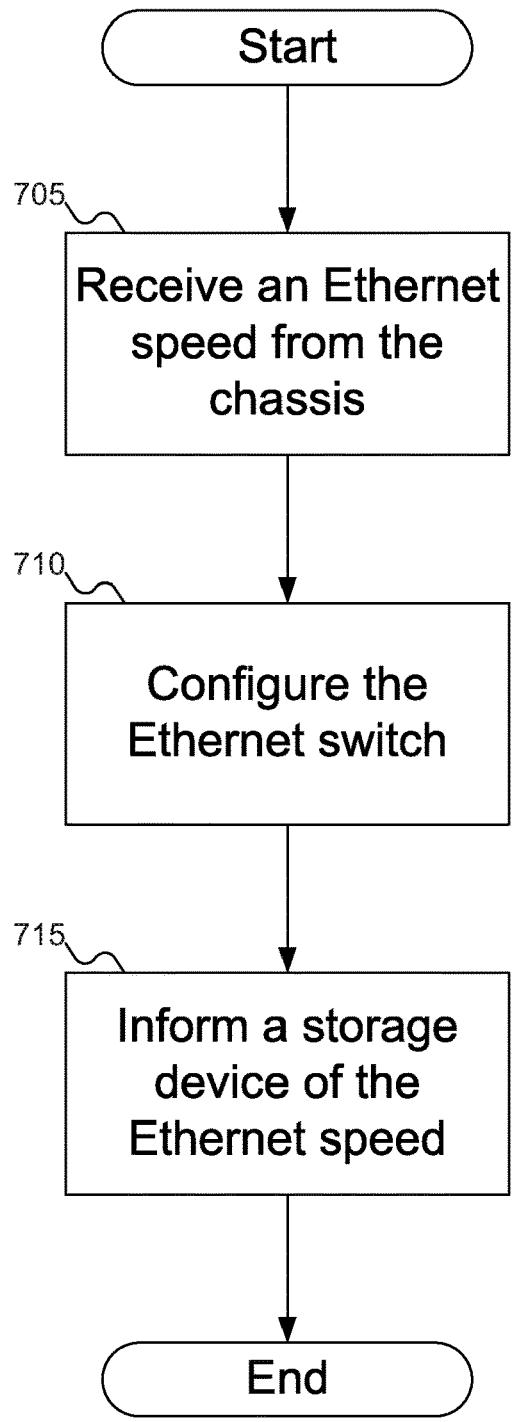
FIG. 7 shows a flowchart of an example procedure for the front-end of the machine of FIG. 1 to inform the storage device of FIG. 1 of the Ethernet speed of the machine of FIG. 1, according to an embodiment of the inventive concept.

FIG. 7 shows a flowchart of an example procedure for the front-end of machine 105 of FIG. 1 to inform storage device 130 of FIG. 1 of the Ethernet speed of machine 105 of FIG. 1, according to an embodiment of the inventive concept. In FIG. 7, at block 705, BMCs 330 and 335 of FIG. 3-4 (or local processor 110 of FIG. 1) may receive the Ethernet speed of the front-end of machine 105 of FIG. 1. At block 710, BMCs 330 and 335 of FIG. 3-4 (or local processor 110 of FIG. 1) may configure Ethernet switches 310 and 315 of FIGS. 3-4. And at block 715, BMCs 330 and 335 of FIG. 3-4 (or local processor 110 of FIG. 1) may inform storage devices 130-1 through 130-6 of FIGS. 3-4 of the Ethernet speed of the front-end of machine 105 of FIG. 1.

Figure 8:
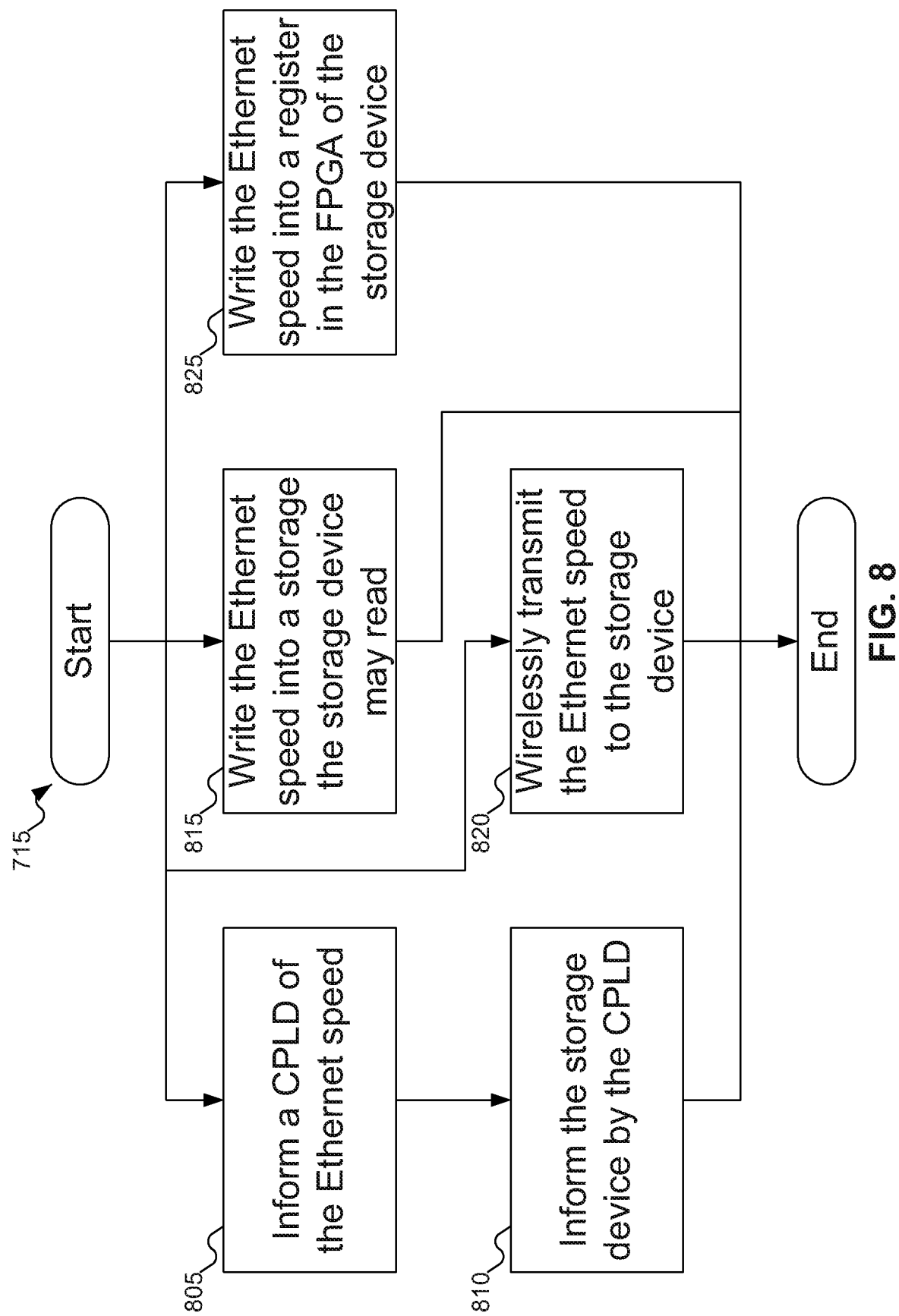
FIG. 8 shows a more detailed flowchart of an example procedure for the front-end of the machine of FIG. 1 to inform the storage device of FIG. 1 of the Ethernet speed of the machine of FIG. 1, according to an embodiment of the inventive concept.

FIG. 8 shows a more detailed flowchart of an example procedure for the front-end of machine 105 of FIG. 1 to inform storage device 130 of FIG. 1 of the Ethernet speed of machine 105 of FIG. 1, according to an embodiment of the inventive concept. In FIG. 8, at block 805, BMCs 330 and 335 of FIG. 3-4 (or local processor 110 of FIG. 1) may inform CPLD 370 of FIGS. 3-4 of the Ethernet speed of the front-end of machine 105 of FIG. 1, and at block 810 CPLD 370 of FIGS. 3-4 may inform storage devices 130-1 through 130-6 of FIGS. 3-4 of the Ethernet speed of the front-end of machine 105 of FIG. 1. CPLD 370 of FIGS. 3-4 may inform storage devices 130-1 through 130-6 of FIGS. 3-4 of the Ethernet speed of the front-end of machine 105 of FIG. 1 using either Ethernet speed pin(s) or GPIO pin(s) via storage device connectors 365-1 through 365-6 of FIGS. 3-4. Alternatively, at block 815, BMCs 330 and 335 of FIG. 3-4 (or local processor 110 of FIG. 1) may write the Ethernet speed into a storage that storage devices 130-1 through 130-6 of FIGS. 3-4 may read: for example, a VPD as might be stored in EEPROM 375 of FIGS. 3-4. Alternatively, at block 820, BMCs 330 and 335 of FIG. 3-4 (or local processor 110 of FIG. 1) may use wireless transmitter 380 of FIGS. 3-4 to wirelessly transmit the Ethernet speed of the front-end of machine 105 of FIG. 1 to storage devices 130-1 through 130-6 of FIGS. 3-4. Alternatively, at block 825, BMCs 330 and 335 of FIG. 3-4 (or local processor 110 of FIG. 1, or CPLD 370 of FIGS. 3-4) may write the Ethernet speed of the front-end of machine 105 of FIG. 1 into a register in FPGAs 350-1 through 350-6 of FIGS. 3-4.

Figure 9:
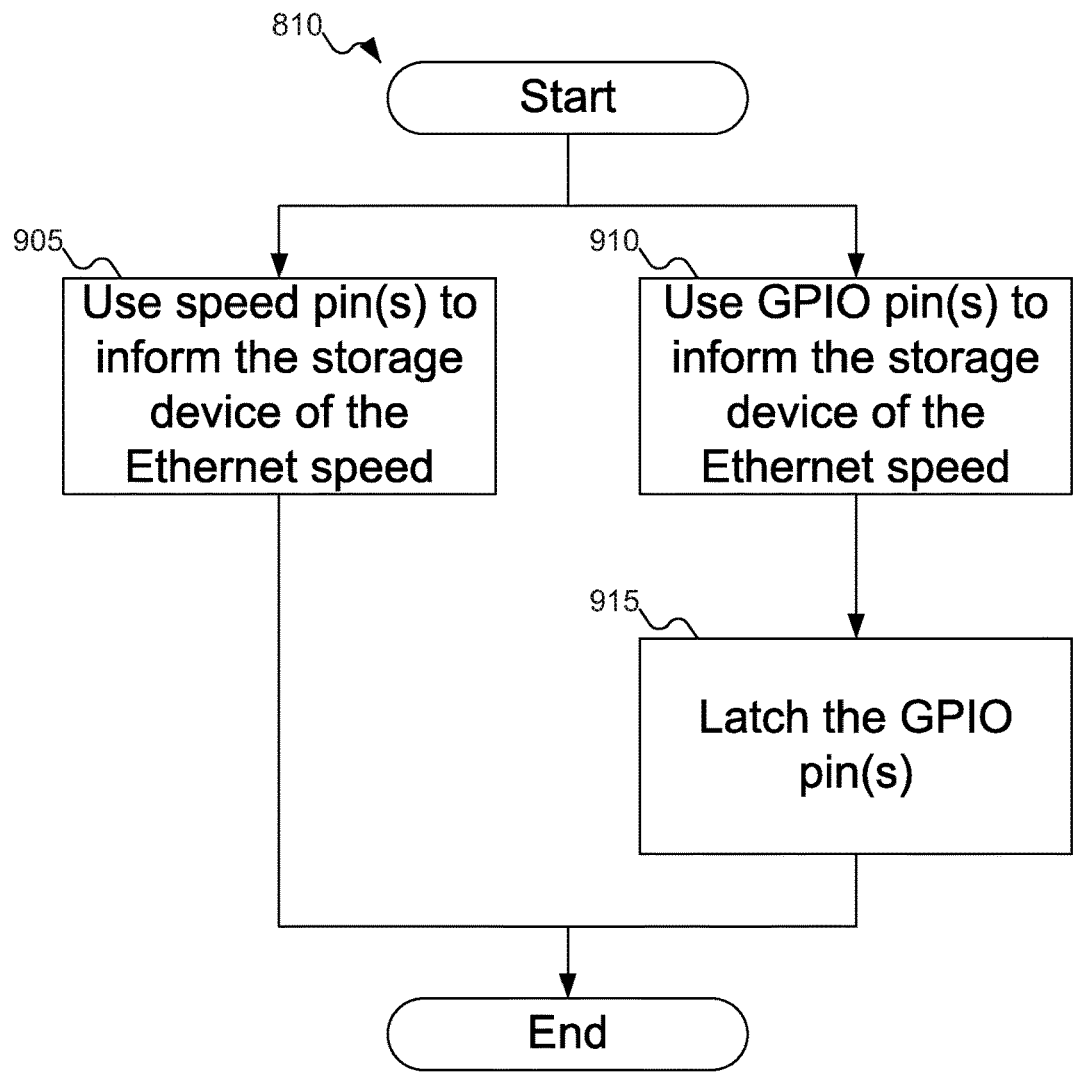
FIG. 9 shows a flowchart of an example procedure for the front-end of the machine of FIG. 1 to inform the storage device of FIG. 1 of the Ethernet speed of the machine of FIG. 1 using pins on a connector to the storage device of FIG. 1, according to an embodiment of the inventive concept.

FIG. 9 shows a flowchart of an example procedure for the front-end of machine 105 of FIG. 1 to inform storage device 130 of FIG. 1 of the Ethernet speed of machine 105 of FIG. 1 using pins on connector 365-1 through 365-6 of FIGS. 3-4 to storage device 130 of FIG. 1, according to an embodiment of the inventive concept. In FIG. 9, at block 905, CPLD 370 of FIGS. 3-4 may use one or more Ethernet speed pins to inform storage device 130 of FIG. 1 of the Ethernet speed of the front-end of machine 105. Alternatively, at block 910, CPLD 370 of FIGS. 3-4 may use one or more GPIO pins to inform storage device 130 of FIG. 1 of the Ethernet speed of the front-end of machine 105, after which CPLD 370 of FIGS. 3-4 may latch the GPIO pin(s) to send other information over the GPIO pins.

Figure 10:
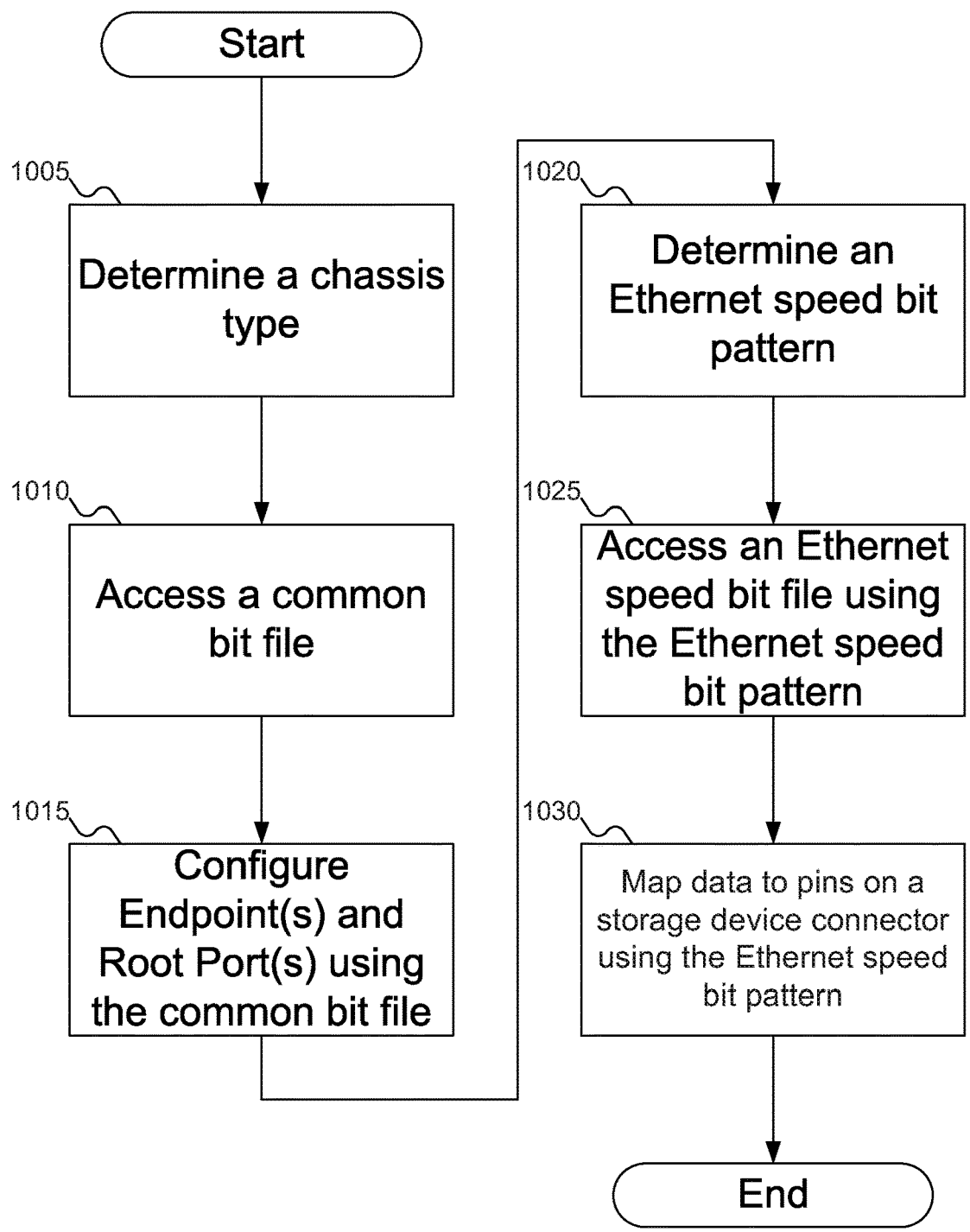
FIG. 10 shows a flowchart of an example procedure for the storage device of FIG. 1 to adjust to the Ethernet speed of the machine of FIG. 1, according to an embodiment of the inventive concept.

FIG. 10 shows a flowchart of an example procedure for storage device 130 of FIG. 1 to adjust to the Ethernet speed of machine 105 of FIG. 1, according to an embodiment of the inventive concept. At block 1005, mapping logic 605 of FIG. 6 may determine the Ethernet chassis type: for example, using the Ethernet chassis type pin on storage device connector 365-1 through 365-6 of FIGS. 3-4. At block 1010, mapping logic 605 of FIG. 6 may access common bit file 640 of FIG. 6. At block 1015, mapping logic 605 of FIG. 6 may configure Endpoint(s) 630-1 and 630-2 of FIG. 6 and Root Port(s) 635-1 and 635-2 of FIG. 6.

At block 1020, mapping logic 605 of FIG. 6 may determine the Ethernet speed of the front-end of machine 105 of FIG. 1. At block 1025, mapping logic 605 of FIG. 6 may access Ethernet speed bit file 645-1 through 645-4 of FIG. 6 based on the Ethernet speed bit pattern. Finally, at block 1030, mapping logic 605 of FIG. 6 may map data to the pins of storage device connector 365-1 through 365-6 of FIGS. 3-4 based on Ethernet speed bit file 645-1 through 645-4 of FIG. 6.

Figure 11:
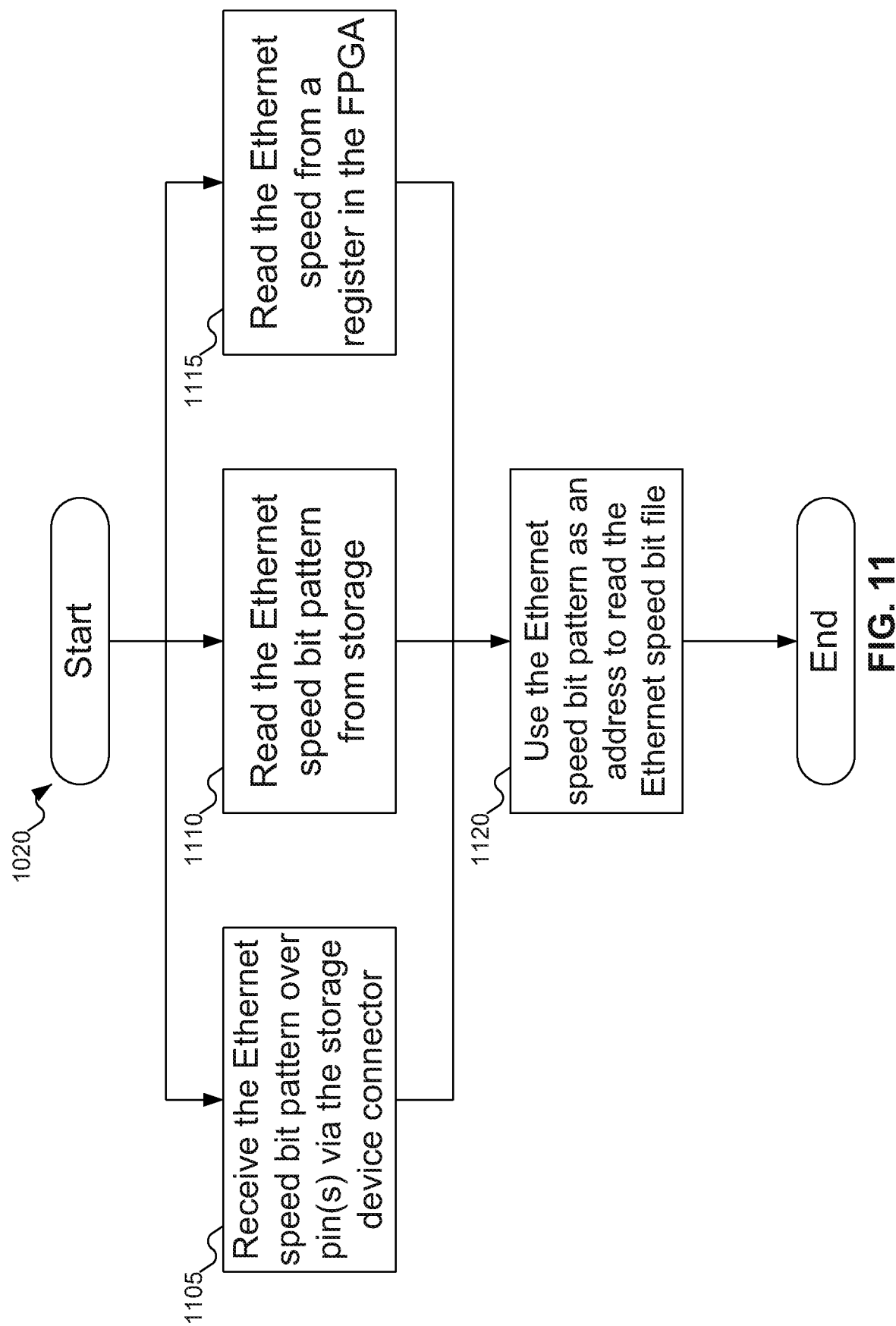
FIG. 11 shows a flowchart of an example procedure for the storage device of FIG. 1 to learn the Ethernet speed of the machine of FIG. 1, according to an embodiment of the inventive concept.

FIG. 11 shows a flowchart of an example procedure for storage device 130 of FIG. 1 to learn the Ethernet speed of machine 105 of FIG. 1, according to an embodiment of the inventive concept. In FIG. 11, at block 1105, mapping logic 605 may receive the Ethernet speed over one or more pins (either GPIO pins or special pins) on storage device connector 365-1 through 365-6 of FIGS. 3-4. Alternatively, at block 1110, mapping logic 605 of FIG. 6 may read the Ethernet speed from storage, such as a VPD in EEPROM 375 of FIGS. 3-4. Alternatively, at block 1115, mapping logic 605 of FIG. 6 may read the Ethernet speed from a register in FPGA 350-1 through 350-6 of FIGS. 3-4. Finally, regardless of how mapping logic 605 of FIG. 6 determines the Ethernet speed of the front-end of machine 105 of FIG. 1, at block 1, mapping logic 605 of FIG. 6 may use the Ethernet speed to determine which Ethernet speed bit file 645-1 through 645-4 of FIG. 6 to load.

In FIGS. 7-11, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. By enabling the chassis front-end to inform the storage device of the Ethernet speed of the chassis front-end, a vendor does not need to offer multiple chassis front-end versions. The chassis front-end may inform the storage device of the Ethernet speed of the chassis front-end, without any components needing to assume a particular Ethernet speed. For example, conventional chassis front-ends may only operate at a single Ethernet speed, and may not support multiple Ethernet speeds, where the data may arrive from the storage device along pins that depend on the Ethernet speed. Thus, for example, a vendor may need to sell one version of the chassis front-end that operates at 10 Gbps, another that operates at 25 Gbps, another that operates at 50 Gbps, and another that operates at 100 Gbps. By enabling the chassis front-end to operate at potentially different Ethernet speeds, and by enabling the chassis front-end to configure itself based on the Ethernet speed, the vendor only needs to offer a single version of the chassis front-end. The chassis front-end is even capable of supporting end-user modifications, such as replacement of the Ethernet switches or the switchboards of the chassis front-end, should the user opt to make such changes on-site.

In a similar way, enabling storage devices to self-configure based on the Ethernet speed of the chassis front-end simplifies the vendor offerings for storage devices as well. Conventional storage devices may be sold in multiple versions, depending on the Ethernet speed of the chassis to which the storage devices will connect. By enabling storage devices to self-configure to the Ethernet speed, a single storage device may be offered instead of a line of storage devices supporting different Ethernet speeds.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a chassis front-end, comprising:

a switchboard including an Ethernet switch, a processor, a Baseboard Management Controller (BMC), and a mid-plane connector to connect to a mid-plane; and a mid-plane including at least one storage device connector to connect to at least one storage device and a speed logic to inform the at least one storage device of an Ethernet speed of a chassis, wherein the chassis supports a first Ethernet speed and a second Ethernet speed.

Statement 2. An embodiment of the inventive concept includes the chassis front-end according to statement 1, wherein:

the first Ethernet speed is 10 Gbps; and
the second Ethernet speed is 100 Gbps.

Statement 3. An embodiment of the inventive concept includes the chassis front-end according to statement 1, wherein the at least one storage device includes at least one Solid State Drive (SSD).

Statement 4. An embodiment of the inventive concept includes the chassis front-end according to statement 3, wherein the at least one storage device connector is drawn from a set including a U.2 connector and an SFF-TA-1008 connector.

Statement 5. An embodiment of the inventive concept includes the chassis front-end according to statement 3, wherein the speed logic includes a Complex Programmable Logic Device (CPLD) that communicates with the at least one SSD using the at least one storage device connector.

Statement 6. An embodiment of the inventive concept includes the chassis front-end according to statement 5, wherein the CPLD is informed of the speed of the chassis by one of the BMC or the processor.

Statement 7. An embodiment of the inventive concept includes the chassis front-end according to statement 6, wherein the CPLD is informed of the speed of the chassis by one of the BMC or the processor using an Inter-Integrated Circuit (I2C) bus.

Statement 8. An embodiment of the inventive concept includes the chassis front-end according to statement 5, wherein the CPLD uses at least one speed pin on the at least-one storage device connector to inform the at least one SSD of the speed of the chassis.

Statement 9. An embodiment of the inventive concept includes the chassis front-end according to statement 5, wherein the CPLD uses at least one General Purpose Input/Output (GPIO) pin on the at least-one storage device connector to inform the at least one SSD of the speed of the chassis, the at least one GPIO pin latched after informing the at least one SSD of the speed of the chassis.

Statement 10. An embodiment of the inventive concept includes the chassis front-end according to statement 3, wherein:

the speed of the chassis may be written into a Vital Product Data (VPD) of an Electrically Erasable Programmable Read-Only Memory (EEPROM); and the at least one SSD may read the speed of the chassis from the VPD of the EEPROM.

Statement 11. An embodiment of the inventive concept includes the chassis front-end according to statement 3, wherein the mid-plane further includes a wireless transmitter to transmit the speed of the chassis to the at least one SSD.

Statement 12. An embodiment of the inventive concept includes the chassis front-end according to statement 3, wherein the speed of the chassis may be written to a register in a Field Programmable Gate Array (FPGA) of the at least one SSD via the at least one storage device connector.

Statement 13. An embodiment of the inventive concept includes the chassis front-end according to statement 3, wherein the Ethernet switch may be configured by one of the BMC or the processor.

Statement 14. An embodiment of the inventive concept includes the chassis front-end according to statement 13, wherein the speed of the Ethernet switch may be set by the one of the BMC or the processor.

Statement 15. An embodiment of the inventive concept includes the chassis front-end according to statement 3, further comprising a second switchboard, the second switchboard including a second Ethernet switch, a second processor, a second BMC, and a second mid-plane connector to connect to the mid-plane, wherein the at least one SSD is a dual port SSD and communicates with both the switchboard and the second switchboard via the at least one storage device connector and the mid-plane.

Statement 16. An embodiment of the inventive concept includes a storage device, comprising:

data storage to store data;

a controller to manage reading and writing data to the data storage;

a storage device connector to connect the storage device to a mid-plane in a chassis, the storage device connector including a plurality of pins;

a bit file storage to store at least two Ethernet speed bit files; and a mapping logic to map the data from the data storage to the plurality of pins on the storage device connector responsive to one of the at least two Ethernet speed bit files.

Statement 17. An embodiment of the inventive concept includes the storage device according to statement 16, wherein the storage device is a Solid State Drive (SSD).

Statement 18. An embodiment of the inventive concept includes the storage device according to statement 17, wherein the controller includes the mapping logic.

Statement 19. An embodiment of the inventive concept includes the storage device according to statement 17, wherein the storage device further comprises an internal connector between the mapping logic and the controller.

Statement 20. An embodiment of the inventive concept includes the storage device according to statement 17, wherein mapping logic is implemented using one of a Field Programmable Gate Array (FPGA), an Application-Specific Integrated Circuit (ASIC), a Graphics Processing Unit (GPU), and a microprocessor.

Statement 21. An embodiment of the inventive concept includes the storage device according to statement 17, wherein the storage device connector is drawn from a set including U.2 connector and SFF-TA-1008 connector.

Statement 22. An embodiment of the inventive concept includes the storage device according to statement 17, wherein the bit file storage further includes a common bit file.

Statement 23. An embodiment of the inventive concept includes the storage device according to statement 17, wherein the mapping logic is operative to access one of the at least two Ethernet speed bit files in the bit file storage according to an Ethernet speed bit pattern received from the chassis.

Statement 24. An embodiment of the inventive concept includes the storage device according to statement 23, wherein the mapping logic is operative to receive the Ethernet speed bit pattern from the chassis using at least one pin on the storage device connector.

Statement 25. An embodiment of the inventive concept includes the storage device according to statement 23, wherein the mapping logic is operative to read the Ethernet speed bit pattern from an Ethernet speed bit pattern storage in the chassis over the storage device connector.

Statement 26. An embodiment of the inventive concept includes the storage device according to statement 23, wherein the mapping logic is operative to use the Ethernet speed bit pattern as an address to locate the one of the at least two Ethernet speed bit files in the bit file storage.

Statement 27. An embodiment of the inventive concept includes the storage device according to statement 17, wherein the bit file storage includes NOR flash memory.

Statement 28. An embodiment of the inventive concept includes the storage device according to statement 17, wherein the storage device connector includes a pin specifying a chassis type.

Statement 29. An embodiment of the inventive concept includes the storage device according to statement 17, wherein the mapping logic is operative to use four Peripheral Component Interconnect Express (PCIe) lanes of the storage device connector as data lanes and to disable Serial Attached Storage (SAS) pins of the storage device connector based in part on a chassis type being a Non-Volatile Memory Express (NVMe) chassis type.

Statement 30. An embodiment of the inventive concept includes the storage device according to statement 17, wherein the mapping logic is operative to use two PCIe lanes of the storage device connector as control lanes, a third PCIe lane of the storage device connector as a first Ethernet lane, and one SAS pin of the storage device connector as a second Ethernet lane based in part on a chassis type being a Non-Volatile Memory Express over Fabric (NVMeoF) chassis type and an Ethernet speed bit pattern received from the chassis specifying a 10 Gbps or 25 Gbps Ethernet mode.

Statement 31. An embodiment of the inventive concept includes the storage device according to statement 17, wherein the mapping logic is operative to use two PCIe lanes of the storage device connector as control lanes, a third PCIe lane of the storage device connector as a first Ethernet lane, a fourth PCIe lane of the storage device connector as a second Ethernet lane, a first SAS pin of the storage device connector as a third Ethernet lane, and a second SAS pin of the storage device connector as a fourth Ethernet lane based in part on a chassis type being a Non-Volatile Memory Express over Fabric (NVMeoF) chassis type and an Ethernet speed bit pattern received from the chassis specifying a 50 Gbps or 100 Gbps Ethernet mode.

Statement 32. An embodiment of the inventive concept includes a method, comprising:

receiving an Ethernet speed of a chassis at a Baseboard Management Controller (BMC) on a switchboard from the chassis; and informing, by the BMC, a storage device in the chassis connected to a chassis front-end of the Ethernet speed of the chassis, the chassis front-end including the switchboard and a mid-plane, wherein the chassis supports a first Ethernet speed and a second Ethernet speed.

Statement 33. An embodiment of the inventive concept includes the method according to statement 32, wherein:

the first Ethernet speed is 10 Gbps; and the second Ethernet speed is 100 Gbps.

Statement 34. An embodiment of the inventive concept includes the method according to statement 32, wherein informing, by the BMC, a storage device in the chassis connected to a chassis front-end of the Ethernet speed of the chassis includes informing, by the BMC, a Solid State Drive (SSD) in the chassis connected to the chassis front-end of the Ethernet speed of the chassis.

Statement 35. An embodiment of the inventive concept includes the method according to statement 34, wherein the chassis front-end connects to the SSD using a storage device connector drawn from a set including a U.2 connector and an SFF-TA-1008 connector.

Statement 36. An embodiment of the inventive concept includes the method according to statement 34, wherein informing, by the BMC, a Solid State Drive (SSD) in the chassis connected to the chassis front-end of the Ethernet speed of the chassis includes:

informing a Complex Programmable Logic Device (CPLD) by the BMC of the Ethernet speed of the chassis; and informing, by the CPLD, the SSD in the chassis connected to the chassis front-end of the Ethernet speed of the chassis.

Statement 37. An embodiment of the inventive concept includes the method according to statement 36, wherein informing a Complex Programmable Logic Device (CPLD) by the BMC of the Ethernet speed of the chassis includes informing the CPLD by the BMC of the Ethernet speed of the chassis using an Inter-Integrated Circuit (I2C) bus.

Statement 38. An embodiment of the inventive concept includes the method according to statement 36, wherein informing, by the CPLD, the SSD in the chassis connected to the chassis front-end of the Ethernet speed of the chassis includes using at least one speed pin on a storage device connector connecting the SSD to the chassis front-end.

Statement 39. An embodiment of the inventive concept includes the method according to statement 36, wherein informing, by the CPLD, the SSD in the chassis connected to the chassis front-end of the Ethernet speed of the chassis includes:

using at least one General Purpose Input/Output (GPIO) pin on a storage device connector connecting the SSD to the chassis front-end; and latching the at least one GPIO pin latched after informing the SSD of the speed of the chassis.

Statement 40. An embodiment of the inventive concept includes the method according to statement 34, wherein informing, by the BMC, a storage device in the chassis connected to a chassis front-end of the Ethernet speed of the chassis includes writing, by the BMC, the Ethernet speed of the chassis to a Vital Product Data (VPD) of an Electrically Erasable Programmable Read-Only Memory (EEPROM), wherein the SSD may read the Ethernet speed of the chassis from the VPD of the EEPROM.

Statement 41. An embodiment of the inventive concept includes the method according to statement 34, wherein informing, by the BMC, a storage device in the chassis connected to a chassis front-end of the Ethernet speed of the chassis includes wirelessly transmitting the Ethernet speed of the chassis from the BMC to the SSD.

Statement 42. An embodiment of the inventive concept includes the method according to statement 34, wherein informing, by the BMC, a storage device in the chassis connected to a chassis front-end of the Ethernet speed of the chassis includes writing, by the BMC, the Ethernet speed of the chassis to a register in a Field Programmable Gate Array (FPGA) of the SSD using a storage device connector.

Statement 43. An embodiment of the inventive concept includes the method according to statement 34, further comprising configuring an Ethernet switch of the switchboard by the BMC.

Statement 44. An embodiment of the inventive concept includes the method according to statement 34, wherein:

the chassis front-end includes a second switchboard connected to the mid-plane; and the SSD is a dual port SSD and communicates with both the switchboard and the second switchboard via the a storage device connector and the mid-plane.

Statement 45. An embodiment of the inventive concept includes a method, comprising:

determining an Ethernet speed bit pattern at a storage device;

accessing a first Ethernet speed bit file from a bit file storage on the storage device responsive to the Ethernet speed bit pattern, the bit file storage storing at least two Ethernet speed bit files; and mapping data from a data storage in the storage device to a plurality of pins on a storage device connector of the storage device responsive to the first Ethernet speed bit file.

Statement 46. An embodiment of the inventive concept includes the method according to statement 45, wherein:

determining an Ethernet speed bit pattern at a storage device includes determining the Ethernet speed bit pattern at a Solid State Drive (SSD);

accessing a first Ethernet speed bit file from a bit file storage on the storage device responsive to the Ethernet speed bit pattern includes accessing the first Ethernet speed bit file from the bit file storage on the SSD responsive to the Ethernet speed bit pattern; and mapping data from a data storage in the storage device to a plurality of pins on a storage device connector of the storage device responsive to the first Ethernet speed bit file includes mapping the data from the data storage in the SSD to the plurality of pins on the storage device connector of the SSD responsive to the first Ethernet speed bit file.

Statement 47. An embodiment of the inventive concept includes the method according to statement 46, wherein the SSD includes a controller to determine the Ethernet speed bit pattern, access the first Ethernet speed bit file, and map the data responsive to the first Ethernet speed bit file.

Statement 48. An embodiment of the inventive concept includes the method according to statement 46, wherein the SSD includes mapping logic separate from a controller to determine the Ethernet speed bit pattern, access the first Ethernet speed bit file, and map the data responsive to the first Ethernet speed bit file.

Statement 49. An embodiment of the inventive concept includes the method according to statement 48, wherein the mapping logic and the controller communicate over an internal connector.

Statement 50. An embodiment of the inventive concept includes the method according to statement 48, wherein the mapping logic is implemented using one of a Field Programmable Gate Array (FPGA), an Application-Specific Integrated Circuit (ASIC), a Graphics Processing Unit (GPU), and a microprocessor.

Statement 51. An embodiment of the inventive concept includes the method according to statement 46, wherein the storage device connector is drawn from a set including U.2 connector and SFF-TA-1008 connector.

Statement 52. An embodiment of the inventive concept includes the method according to statement 46, further comprising:
  accessing a common bit file from the bit file storage; and
  configuring an Endpoint and a Root Port of the SSD according to the common bit file.

Statement 53. An embodiment of the inventive concept includes the method according to statement 46, wherein determining the Ethernet speed bit pattern at a Solid State Drive (SSD) includes receiving the Ethernet speed bit pattern from the chassis over at least one pin on the storage device connector.

Statement 54. An embodiment of the inventive concept includes the method according to statement 46, wherein determining the Ethernet speed bit pattern at a Solid State Drive (SSD) includes reading the Ethernet speed bit pattern from an Ethernet speed bit pattern storage on the chassis using the storage device connector.

Statement 55. An embodiment of the inventive concept includes the method according to statement 46, wherein determining the Ethernet speed bit pattern at a Solid State Drive (SSD) includes reading the Ethernet speed bit pattern from a Field Programmable Gate Array (FPGA).

Statement 56. An embodiment of the inventive concept includes the method according to statement 46, wherein accessing the first Ethernet speed bit file from the bit file storage on the SSD responsive to the Ethernet speed bit pattern includes using the Ethernet speed bit pattern as an address to locate the first Ethernet speed bit file in the bit file storage.

Statement 57. An embodiment of the inventive concept includes the method according to statement 56, wherein the bit file storage includes NOR flash memory.

Statement 58. An embodiment of the inventive concept includes the method according to statement 45, further comprising determining a chassis type from a pin in the storage device connector.

Statement 59. An embodiment of the inventive concept includes the method according to statement 45, wherein mapping data from a data storage in the storage device to a plurality of pins on a storage device connector of the storage device responsive to the first Ethernet speed bit file includes using four Peripheral Component Interconnect Express (PCIe) lanes of the storage device connector as data lanes and disabling Serial Attached Storage (SAS) pins of the storage device connector based in part on a chassis type being a Non-Volatile Memory Express (NVMe) chassis type.

Statement 60. An embodiment of the inventive concept includes the method according to statement 45, wherein mapping data from a data storage in the storage device to a plurality of pins on a storage device connector of the storage device responsive to the first Ethernet speed bit file includes using two PCIe lanes of the storage device connector as control lanes, a third PCIe lane of the storage device connector as a first Ethernet lane, and one SAS pin of the storage device connector as a second Ethernet lane based in part on a chassis type being a Non-Volatile Memory Express over Fabric (NVMeoF) chassis type and an Ethernet speed bit pattern received from the chassis specifying a 10 Gbps or 25 Gbps Ethernet mode.

Statement 61. An embodiment of the inventive concept includes the method according to statement 45, wherein mapping data from a data storage in the storage device to a plurality of pins on a storage device connector of the storage device responsive to the first Ethernet speed bit file includes using two PCIe lanes of the storage device connector as control lanes, a third PCIe lane of the storage device connector as a first Ethernet lane, a fourth PCIe lane of the storage device connector as a second Ethernet lane, a first SAS pin of the storage device connector as a third Ethernet lane, and a second SAS pin of the storage device connector as a fourth Ethernet lane based in part on a chassis type being a Non-Volatile Memory Express over Fabric (NVMeoF) chassis type and an Ethernet speed bit pattern received from the chassis specifying a 50 Gbps or 100 Gbps Ethernet mode.

Statement 62. An embodiment of the inventive concept includes an article, comprising a non-transitory storage medium, the non-transitory storage medium having stored thereon instructions that, when executed by a machine, result in:
  receiving an Ethernet speed of a chassis at a Baseboard Management Controller (BMC) on a switchboard from the chassis; and
  informing, by the BMC, a storage device in the chassis connected to a chassis front-end of the Ethernet speed of the chassis, the chassis front-end including the switchboard and a mid-plane,
  wherein the chassis supports a first Ethernet speed and a second Ethernet speed.

Statement 63. An embodiment of the inventive concept includes the article according to statement 62, wherein:
  the first Ethernet speed is 10 Gbps; and
  the second Ethernet speed is 100 Gbps.

Statement 64. An embodiment of the inventive concept includes the article according to statement 62, wherein informing, by the BMC, a storage device in the chassis connected to a chassis front-end of the Ethernet speed of the chassis includes informing, by the BMC, a Solid State Drive (SSD) in the chassis connected to the chassis front-end of the Ethernet speed of the chassis.

Statement 65. An embodiment of the inventive concept includes the article according to statement 64, wherein the chassis front-end connects to the SSD using a storage device connector drawn from a set including a U.2 connector and an SFF-TA-1008 connector.

Statement 66. An embodiment of the inventive concept includes the article according to statement 64, wherein informing, by the BMC, a Solid State Drive (SSD) in the chassis connected to the chassis front-end of the Ethernet speed of the chassis includes:
  informing a Complex Programmable Logic Device (CPLD) by the BMC of the Ethernet speed of the chassis; and
  informing, by the CPLD, the SSD in the chassis connected to the chassis front-end of the Ethernet speed of the chassis.

Statement 67. An embodiment of the inventive concept includes the article according to statement 66, wherein informing a Complex Programmable Logic Device (CPLD) by the BMC of the Ethernet speed of the chassis includes informing the CPLD by the BMC of the Ethernet speed of the chassis using an Inter-Integrated Circuit (I2C) bus.

Statement 68. An embodiment of the inventive concept includes the article according to statement 66, wherein informing, by the CPLD, the SSD in the chassis connected to the chassis front-end of the Ethernet speed of the chassis includes using at least one speed pin on a storage device connector connecting the SSD to the chassis front-end.

Statement 69. An embodiment of the inventive concept includes the article according to statement 66, wherein informing, by the CPLD, the SSD in the chassis connected to the chassis front-end of the Ethernet speed of the chassis includes:

using at least one General Purpose Input/Output (GPIO) pin on a storage device connector connecting the SSD to the chassis front-end; and latching the at least one GPIO pin latched after informing the SSD of the speed of the chassis.

Statement 70. An embodiment of the inventive concept includes the article according to statement 64, wherein informing, by the BMC, a storage device in the chassis connected to a chassis front-end of the Ethernet speed of the chassis includes writing, by the BMC, the Ethernet speed of the chassis to a Vital Product Data (VPD) of an Electrically Erasable Programmable Read-Only Memory (EEPROM), wherein the SSD may read the Ethernet speed of the chassis from the VPD of the EEPROM.

Statement 71. An embodiment of the inventive concept includes the article according to statement 64, wherein informing, by the BMC, a storage device in the chassis connected to a chassis front-end of the Ethernet speed of the chassis includes wirelessly transmitting the Ethernet speed of the chassis from the BMC to the SSD.

Statement 72. An embodiment of the inventive concept includes the article according to statement 64, wherein informing, by the BMC, a storage device in the chassis connected to a chassis front-end of the Ethernet speed of the chassis includes writing, by the BMC, the Ethernet speed of the chassis to a register in a Field Programmable Gate Array (FPGA) of the SSD using a storage device connector.

Statement 73. An embodiment of the inventive concept includes the article according to statement 64, the non-transitory storage medium having stored thereon further instructions that, when executed by the machine, result in configuring an Ethernet switch of the switchboard by the BMC.

Statement 74. An embodiment of the inventive concept includes the article according to statement 64, wherein:

the chassis front-end includes a second switchboard connected to the mid-plane; and the SSD is a dual port SSD and communicates with both the switchboard and the second switchboard via the a storage device connector and the mid-plane.

Statement 75. An embodiment of the inventive concept includes an article, comprising a non-transitory storage medium, the non-transitory storage medium having stored thereon instructions that, when executed by a machine, result in:

determining an Ethernet speed bit pattern at a storage device;

accessing a first Ethernet speed bit file from a bit file storage on the storage device responsive to the Ethernet speed bit pattern, the bit file storage storing at least two Ethernet speed bit files; and mapping data from a data storage in the storage device to a plurality of pins on a storage device connector of the storage device responsive to the first Ethernet speed bit file.

Statement 76. An embodiment of the inventive concept includes the article according to statement 75, wherein:

determining an Ethernet speed bit pattern at a storage device includes determining the Ethernet speed bit pattern at a Solid State Drive (SSD);

accessing a first Ethernet speed bit file from a bit file storage on the storage device responsive to the Ethernet speed bit pattern includes accessing the first Ethernet speed bit file from the bit file storage on the SSD responsive to the Ethernet speed bit pattern; and mapping data from a data storage in the storage device to a plurality of pins on a storage device connector of the storage device responsive to the first Ethernet speed bit file includes mapping the data from the data storage in the SSD to the plurality of pins on the storage device connector of the SSD responsive to the first Ethernet speed bit file.

Statement 77. An embodiment of the inventive concept includes the article according to statement 76, wherein the SSD includes a controller to determine the Ethernet speed bit pattern, access the first Ethernet speed bit file, and map the data responsive to the first Ethernet speed bit file.

Statement 78. An embodiment of the inventive concept includes the article according to statement 76, wherein the SSD includes mapping logic separate from a controller to determine the Ethernet speed bit pattern, access the first Ethernet speed bit file, and map the data responsive to the first Ethernet speed bit file.

Statement 79. An embodiment of the inventive concept includes the article according to statement 78, wherein the mapping logic and the controller communicate over an internal connector.

Statement 80. An embodiment of the inventive concept includes the article according to statement 78, wherein the mapping logic is implemented using one of a Field Programmable Gate Array (FPGA), an Application-Specific Integrated Circuit (ASIC), a Graphics Processing Unit (GPU), and a microprocessor.

Statement 81. An embodiment of the inventive concept includes the article according to statement 76, wherein the storage device connector is drawn from a set including U.2 connector and SFF-TA-1008 connector.

Statement 82. An embodiment of the inventive concept includes the article according to statement 76, the non-transitory storage medium having stored thereon further instructions that, when executed by the machine, result in:

accessing a common bit file from the bit file storage; and configuring an Endpoint and a Root Port of the SSD according to the common bit file.

Statement 83. An embodiment of the inventive concept includes the article according to statement 76, wherein determining the Ethernet speed bit pattern at a Solid State Drive (SSD) includes receiving the Ethernet speed bit pattern from the chassis over at least one pin on the storage device connector.

Statement 84. An embodiment of the inventive concept includes the article according to statement 76, wherein determining the Ethernet speed bit pattern at a Solid State Drive (SSD) includes reading the Ethernet speed bit pattern from an Ethernet speed bit pattern storage on the chassis using the storage device connector.

Statement 85. An embodiment of the inventive concept includes the article according to statement 76, wherein determining the Ethernet speed bit pattern at a Solid State Drive (SSD) includes reading the Ethernet speed bit pattern from a Field Programmable Gate Array (FPGA).

Statement 86. An embodiment of the inventive concept includes the article according to statement 76, wherein accessing the first Ethernet speed bit file from the bit file storage on the SSD responsive to the Ethernet speed bit pattern includes using the Ethernet speed bit pattern as an address to locate the first Ethernet speed bit file in the bit file storage.

Statement 87. An embodiment of the inventive concept includes the article according to statement 86, wherein the bit file storage includes NOR flash memory.

Statement 88. An embodiment of the inventive concept includes the article according to statement 75, the non-transitory storage medium having stored thereon further instructions that, when executed by the machine, result in determining a chassis type from a pin in the storage device connector.

Statement 89. An embodiment of the inventive concept includes the article according to statement 75, wherein mapping data from a data storage in the storage device to a plurality of pins on a storage device connector of the storage device responsive to the first Ethernet speed bit file includes using four Peripheral Component Interconnect Express (PCIe) lanes of the storage device connector as data lanes and disabling Serial Attached Storage (SAS) pins of the storage device connector based in part on a chassis type being a Non-Volatile Memory Express (NVMe) chassis type.

Statement 90. An embodiment of the inventive concept includes the article according to statement 75, wherein mapping data from a data storage in the storage device to a plurality of pins on a storage device connector of the storage device responsive to the first Ethernet speed bit file includes using two PCIe lanes of the storage device connector as control lanes, a third PCIe lane of the storage device connector as a first Ethernet lane, and one SAS pin of the storage device connector as a second Ethernet lane based in part on a chassis type being a Non-Volatile Memory Express over Fabric (NVMeoF) chassis type and an Ethernet speed bit pattern received from the chassis specifying a 10 Gbps or 25 Gbps Ethernet mode.

Statement 91. An embodiment of the inventive concept includes the article according to statement 75, wherein mapping data from a data storage in the storage device to a plurality of pins on a storage device connector of the storage device responsive to the first Ethernet speed bit file includes using two PCIe lanes of the storage device connector as control lanes, a third PCIe lane of the storage device connector as a first Ethernet lane, a fourth PCIe lane of the storage device connector as a second Ethernet lane, a first SAS pin of the storage device connector as a third Ethernet lane, and a second SAS pin of the storage device connector as a fourth Ethernet lane based in part on a chassis type being a Non-Volatile Memory Express over Fabric (NVMeoF) chassis type and an Ethernet speed bit pattern received from the chassis specifying a 50 Gbps or 100 Gbps Ethernet mode.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A first device, comprising:
   an interface to connect to a second device via a connector; and
   a mode component to receive from the second device a signal, the second device configured to send the signal, wherein the first device is configured to change from a first mode of operation to a second mode of operation based at least in part on the signal, the first mode of operation associated with a first speed of operation and the second mode of operation associated with a second speed of operation, the first speed of operation being faster than the second speed of operation.

2. The first device according to claim 1, wherein the first device includes at least one Solid State Drive (SSD).

3. The first device according to claim 2, wherein the mode component includes a controller device to communicate with the second device using the connector.

4. The first device according to claim 1, wherein the connector includes at least one pin to receive the signal from the second device.

5. The first device according to claim 1, wherein the connector includes at least one General Purpose Input/Output (GPIO) pin to receive the signal from the second device, the at least one GPIO pin latched after receiving the signal from the second device.

6. A method, comprising:
   receiving a signal at a first device from a second device over an interface to connect to the second device via a connector, the second device sending the signal; and
   configuring the first device to change from a first mode of operation to a second mode of operation, the first mode of operation associated with a first speed of operation and the second mode of operation associated with a second speed of operation.

7. The method according to claim 6, wherein receiving the signal at the first device from the second device over the interface to connect to the second device via the connector includes receiving the signal at a Solid State Drive (SSD) from the second device over the interface to connect to the second device via the connector.

8. The method according to claim 6, wherein receiving the signal at the first device from the second device over the interface to connect to the second device via the connector includes receiving the signal at a controller device of the first device from the second device over the interface to connect to the second device via the connector.

9. The method according to claim 6, wherein receiving the signal at the first device from the second device over the interface to connect to the second device via the connector includes receiving the signal at the first device from the second device over the interface to connect to the second device via a speed pin on the connector.

10. The method according to claim 6, wherein receiving the signal at the first device from the second device over the interface to connect to the second device via the connector includes:
    receiving the signal at the first device from the second device over the interface to connect to the second device via a General Purpose Input/Output (GPIO) pin on the connector; and
    latching the GPIO pin after receiving the signal at the first device.

11. The first device of claim 1, wherein the first device includes a Non-Volatile Memory Express (NVMe) device.

12. The first device according to claim 1, wherein the interface includes a Peripheral Component Interconnect Express (PCIe) interface.

13. The first device according to claim 1, wherein the connector includes an M.2 connector.

14. The first device according to claim 1, wherein the first speed of operation is faster than the second speed of operation.

15. The method according to claim 6, wherein the first device includes a Non-Volatile Memory Express (NVMe) device.

16. The method according to claim 6, wherein the interface includes a Peripheral Component Interconnect Express (PCIe) interface.

17. The method according to claim 6, wherein the connector includes an M.2 connector.

18. The method according to claim 6, wherein the first speed of operation is faster than the second speed of operation.

* * * * *